United States Patent
Aldana et al.

(10) Patent No.: US 12,388,489 B2
(45) Date of Patent: Aug. 12, 2025

(54) METHODS AND SYSTEMS OF SEGMENT SPLITTING ACROSS FRAMES

(71) Applicant: Meta Platforms Technologies, LLC, Menlo Park, CA (US)

(72) Inventors: Carlos Horacio Aldana, Mountain View, CA (US); Chittabrata Ghosh, Fremont, CA (US); Kangjin Yoon, Menlo Park, CA (US)

(73) Assignee: Meta Platforms Technologies, LLC

( * ) Notice: Subject to any disclaimer, the term of this patent is extended or adjusted under 35 U.S.C. 154(b) by 28 days.

(21) Appl. No.: 17/962,136

(22) Filed: Oct. 7, 2022

(65) Prior Publication Data

US 2023/0141358 A1    May 11, 2023

Related U.S. Application Data

(60) Provisional application No. 63/277,244, filed on Nov. 9, 2021.

(51) Int. Cl.
*H04B 1/7183* (2011.01)

(52) U.S. Cl.
CPC .................. *H04B 1/7183* (2013.01)

(58) Field of Classification Search
CPC ...... H04B 1/7183; H04B 1/719; H04B 1/718; H04B 1/7163; G01S 13/0209
See application file for complete search history.

(56) References Cited

U.S. PATENT DOCUMENTS

| | | | |
|---|---|---|---|
| 10,992,419 B1* | 4/2021 | Zhou | H04L 1/0618 |
| 2013/0250853 A1* | 9/2013 | Eravelli | H04W 80/06 370/328 |
| 2016/0294697 A1* | 10/2016 | Varadarajan | H04L 47/12 |
| 2021/0099863 A1* | 4/2021 | Naguib | H04W 12/63 |
| 2021/0242901 A1* | 8/2021 | Hammerschmidt | H04W 52/0258 |
| 2022/0137177 A1* | 5/2022 | Hammerschmidt | G01S 13/003 455/456.1 |
| 2022/0141076 A1* | 5/2022 | Hammerschmidt | H04L 5/0098 375/262 |

(Continued)

FOREIGN PATENT DOCUMENTS

WO    WO-2022231205 A1 *  11/2022  ............... G01S 11/02

OTHER PUBLICATIONS

Hammerschmidt J.S. et al., "Narrowband Assisted Multi-Millisecond UWB," IEEE Draft, 15-21-0409-00-04AB-Narrowband-Assisted-Multimillisecond-Uwb, vol. 802.15.4ab, Jul. 20, 2021, 10 pages.

(Continued)

*Primary Examiner* — Sophia Vlahos
(74) *Attorney, Agent, or Firm* — FOLEY & LARDNER LLP

(57) ABSTRACT

Systems and methods of segment splitting across frames include a first ultra-wideband (UWB) device that determines to split a scrambled timestamp sequence (STS) into at least a first portion and a second portion of the STS, for transmission to a second UWB device. The first UWB device may transmit a first frame comprising the first portion of the STS to the second UWB device. The first UWB device may transmit a second frame comprising the second portion of the STS to the second UWB device.

20 Claims, 36 Drawing Sheets

(56) References Cited

U.S. PATENT DOCUMENTS

2022/0240102 A1* 7/2022 Hong .................. H01Q 21/065
2022/0350013 A1* 11/2022 Kim ..................... H04W 88/02

OTHER PUBLICATIONS

"IEEE Standard for Low-Rate Wireless Networks—Amendment 1: Enhanced Ultra Wideband (UWB) Physical Layers (PHYs) and Associated Ranging Techniques; IEEE Std 802.15.4z-2020 (Amendment to IEEE Std 802.15.4-2020)," IEEE Standard, Aug. 25, 2020, XP068170639, DOI: 10.1109/IEEESTD.2020.9179124, Retrieved from the Internet: URL: https://ieeexplore.ieee.org/document/9179124, [retrieved on Aug. 31, 2020], 174 pages.
International Search report and Written Opinion for International Application No. PCT/US2022/049064, mailed Mar. 1, 2023, 11 pages.
Sun L., et al., "MMS-UWB Ranging Integrity Protection via Time Hopping," IEEE Draft; 15-22-0474-00-04AB-MMS-UWB-Ranging-Integrityprotection-via-Time-Hopping, vol. 802.15.4ab, Sep. 12, 2022, 10 pages.

* cited by examiner

| Octets: 2 | 1 | 4/10 | variable | 2 | variable | variable | variable | 2/4 |
|---|---|---|---|---|---|---|---|---|
| Frame Control | Sequence number | Addressing fields | Auxiliary Security Header | Superframe Specification | GTS info | Pending address | Beacon payload | FCS |
| MHR | | | | MAC Payload | | | | MFR |

FIG. 5

| Codeword Block Length | Rate | Info. Bits |
|---|---|---|
| 1944 | 1/2 | 972 |
| 1296 | 1/2 | 648 |
| 648 | 1/2 | 324 |

LDPC Encoder

FIG. 12

| Slot Index | Mnemonic | STS Packet Format | Sender |
|---|---|---|---|
| 0 | Pre-POLL | SP0 : Data Packet | Initiator |
| 1 | POLL | SP3 : RFRAME | Initiator |
| 1+1 | Response_0 | SP3 : RFRAME | Responder |
| 1+2 | Response_1 | SP3 : RFRAME | Responder |
| ... | ... | SP3 : RFRAME | Responder |
| $1+N^k_{Responder}$ | Response_$N^k_{Responder}$-1 | SP3 : RFRAME | Responder |
| $1+N^k_{Responder}$+1 | Final | SP3 : RFRAME | Initiator |
| $1+N^k_{Responder}$+2=$N^k_{Packets}$ | Final_Data | SP0 : Data Packet | Initiator |
| $1+N^k_{Responder}$+3 | Slot not used | N/A | N/A |
| . | Slot not used | N/A | N/A |
| $N^k_{Slot\_per\_Round}$-1 | Slot not used | N/A | N/A |

FIG. 16

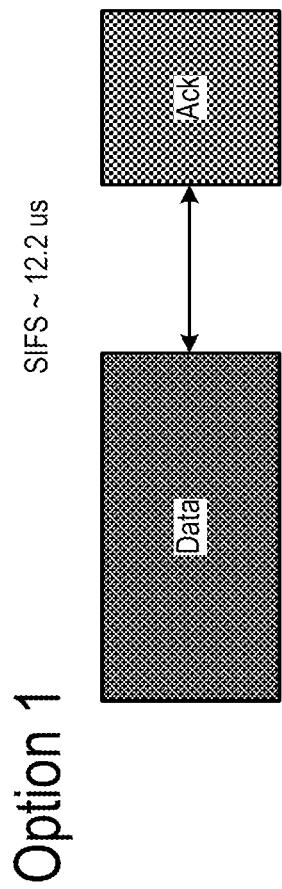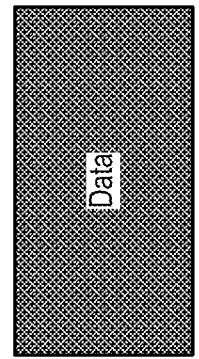
Option 1
Option 2 (no Ack)
Option 3: (option2 with a Block Ack that Acks multiple Data packets
FIG. 18

| 16 bits | 8 bits | 32 or 80 bits | 8 bits | 8 bits | 4 bits | 4 bits | 8 bits | 16 or 32 bits |
|---|---|---|---|---|---|---|---|---|
| Frame Control | Sequence Number | Addressing fields | Min Block Duration (T_block_min_2ms) | Block Duration (T_block_min_Multiplier) | Chap per slot | Slot per Round | Number of Idle Rounds | FCS |

FIG. 19

| | Example 1 |
|---|---|
| Tblock_min_2m | 24 |
| Chap per slot | 3 |
| Slots per round | 8 |
| Tblock_min_Multiplier | 2 |
| Number of idle rounds | Any number between 0 and 12 |

FIG. 20

| 16 bits | 8 bits | 32 or 80 bits | 8 bits | 4 bits | 4 bits | 8 bits | 16 or 32 bits |
|---|---|---|---|---|---|---|---|
| Frame Control | Sequence Number | Addressing fields | Block Duration (T_block_min_Multiplier) | Chap per slot | Slot per Round | Number of Idle Rounds | FCS |

FIG. 21

|  | Example 1 |
|---|---|
| Chap per slot | 3 |
| Slots per round | 8 |
| Tblock_min_Multiplier | 2 |
| Number of idle rounds | Any number between 0 and 24 |

FIG. 22

METHODS AND SYSTEMS OF SEGMENT SPLITTING ACROSS FRAMES

CROSS-REFERENCE TO RELATED PATENT APPLICATIONS

This application claims the benefit of and priority to U.S. Provisional App. No. 63/277,244, filed Nov. 9, 2021, the contents of which are incorporated herein by reference in its entirety for all purposes.

BACKGROUND

The development of ultra-wideband devices has shown promise in determining accurate ranging between devices. Devices operating in the ultra-wideband spectrum may transmit or exchange frames having various configurations or formatting.

SUMMARY

In various aspects, this disclosure is directed to systems, methods, and devices for segment splitting across frames. A first ultra-wideband (UWB) device may determine to split a scrambled timestamp sequence (STS) into at least a first portion and a second portion of the STS, for transmission to a second UWB device. The first UWB device may transmit a first frame including the first portion of the STS to the second UWB device. The first UWB device may transmit a second frame comprising the second portion of the STS to the second UWB device.

In some embodiments, determining to split the STS into at least the first portion and the second portion of the STS, is responsive to a size of a payload for transmission to the second UWB device or a metric corresponding to a connection between the first UWB device and the second UWB device. In some embodiments, determining to split the STS into at least the first portion and the second portion includes determining, by the first UWB device, that a duration to transmit the payload is greater than a slot duration. Determining to split the STS may include determining, by the first UWB device, a number of frames to generate according to the duration to transmit the payload, and the slot duration. Determining to split the STS may include splitting, by the first UWB device, the STS into at least the first portion and the second portion according to the number of frames.

In some embodiments, the first frame includes a first portion of a payload for transmission to the second UWB device. The second frame may include a second portion of the payload for transmission to the second UWB device, where the first portion is greater in size than the second portion of the payload. In some embodiments, transmitting the first frame to the second UWB device includes transmitting, by the first UWB device, the first frame in a first time window to the second UWB device. Transmitting the second frame to the second UWB device may include transmitting, by the first UWB device, the second frame in a second time window to the second UWB device. In some embodiments, the first time window and the second time window respectively include a) a first sub-slot and a second sub-slot within one slot of a slot schedule, or b) a first slot and a second slot of the slot schedule.

In some embodiments, the first frame includes a first portion of a header for transmission to the second UWB device, and the second frame includes a second portion of the header. In some embodiments, the first frame includes a first portion of a synchronization signal for transmission to the second UWB device, and the second frame includes a second portion of the synchronization signal. In some embodiments, the first UWB device generates at least four frames including the first frame and the second frame, for transmission by the first UWB device to the second UWB device, the at least four frames including respective portions of the STS. In some embodiments, the first UWB device receives an acknowledgement message from the second UWB device, in response to the first frame and the second frame. In some embodiments, the acknowledgement message includes a) an acknowledgement of the first frame and the second frame, and b) payload data.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing.

FIG. 5 is a diagram of a beacon frame format, according to an example implementation of the present disclosure.

FIG. 12 is a diagram of low density parity check codes which may be used in the system of FIG. 11, according to an example implementation of the present disclosure.

FIG. 16 is another diagram showing data communication incorporated into a ranging round, according to an example implementation of the present disclosure.

FIG. 18 is a diagram showing data communication with and without acknowledgements, according to an example implementation of the present disclosure.

FIG. 19 is a diagram of a beacon frame/signal structure, according to an example implementation of the present disclosure.

FIG. 20 is a diagram of an example beacon frame/signal using the beacon signal structure of FIG. 19, according to an example implementation of the present disclosure.

FIG. 21 is another diagram of a beacon frame/signal structure, according to an example implementation of the present disclosure.

FIG. 22 is a diagram of an example beacon frame/signal using the beacon frame/signal structure of FIG. 21, according to an example implementation of the present disclosure.

DETAILED DESCRIPTION

Figure 1:
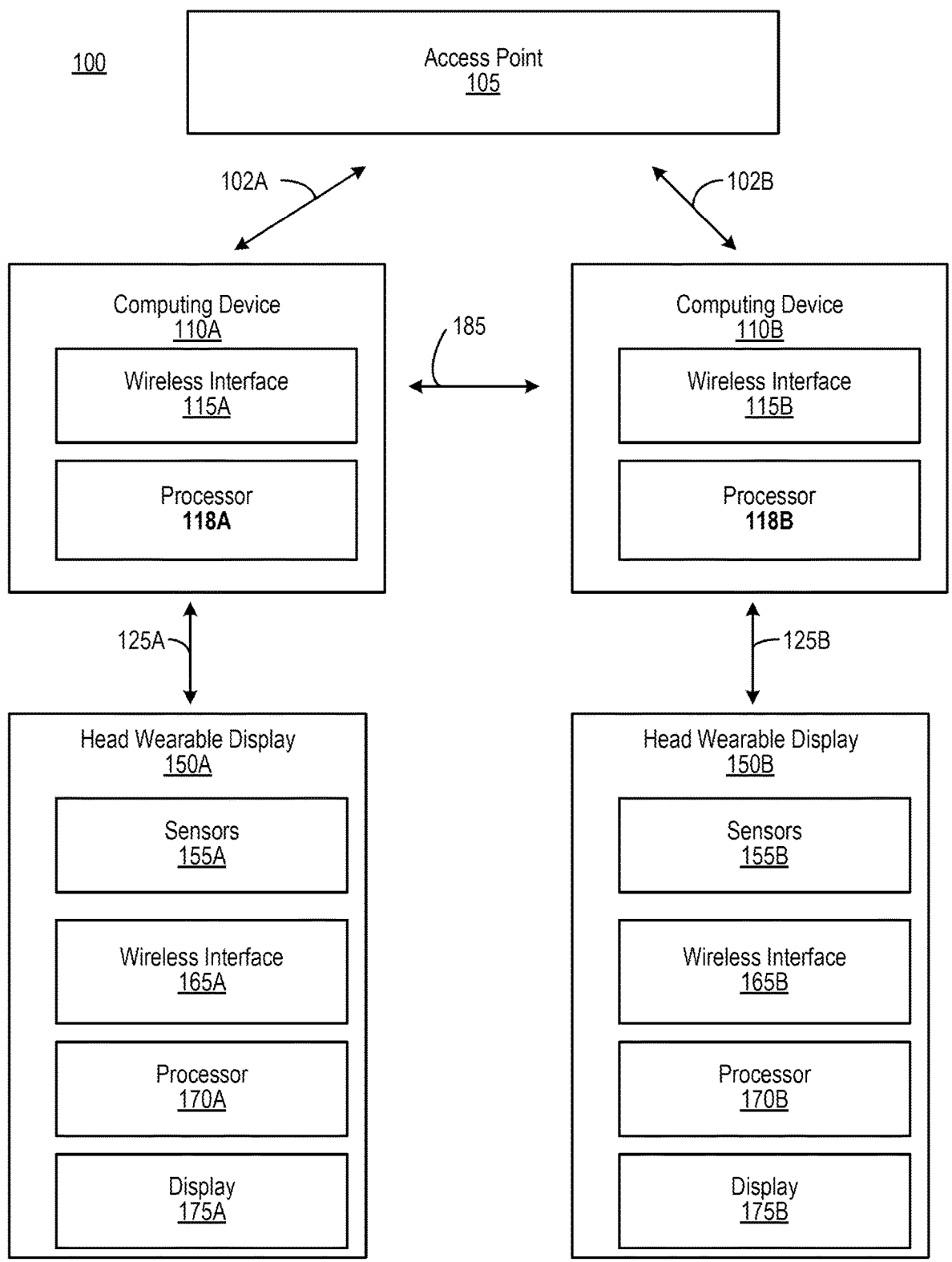
FIG. 1 is a diagram of a system environment including an artificial reality system, according to an example implementation of the present disclosure.

Before turning to the figures, which illustrate certain embodiments in detail, it should be understood that the present disclosure is not limited to the details or methodology set forth in the description or illustrated in the figures.

It should also be understood that the terminology used herein is for the purpose of description only and should not be regarded as limiting.

Disclosed herein are embodiments related to devices, systems, and methods operating in the ultra-wideband (UWB) spectrum. In various embodiments, UWB devices operate in the 3-10 GHz unlicensed spectrum using 500+ MHz channels which may require low power for transmission. Using simple modulation and spread spectrum, UWB devices may achieve reasonable resistance to Wi-Fi and Bluetooth interference (as well as resistance to interference with other UWB devices located in the environment) for very low data rates (e.g., 10 s to 100 s Kbps) and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging and security. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions.

The systems and methods described herein may determine to split a segment of a frame for transmission to another UWB device according to various criteria. For example, if a protocol packet data unit (PPDU) duration is larger than a time window, a device may determine to distribute, fragment, or otherwise split one or more segments of the frame across multiple frames. As another example, if a metric (e.g., link quality) corresponding to a link/connection/channel between two devices satisfy a threshold criteria, the device may determine to distribute one or more segments of a frame across multiple frames. Such implementations and embodiments may provide stronger fidelity of packets or frames, since larger size frames have been observed to be more prone to packet drop or error than smaller sized frames. Additional advantages of the systems and methods described herein are discussed in greater detail below.

FIG. 1 is a block diagram of an example artificial reality system environment 100. In some embodiments, the artificial reality system environment 100 includes an access point (AP) 105, one or more HWDs 150 (e.g., HWD 150A, 150B), and one or more computing devices 110 (computing devices 110A, 110B; sometimes referred to as stage devices or consoles) providing data for artificial reality to the one or more HWDs 150. The access point 105 may be a router or any network device allowing one or more computing devices 110 and/or one or more HWDs 150 to access a network (e.g., the Internet). The access point 105 may be replaced by any communication device (cell site). A computing device 110 may be a custom device or a mobile device that can retrieve content from the access point 105, and provide image data of artificial reality to a corresponding HWD 150. Each HWD 150 may present the image of the artificial reality to a user according to the image data. In some embodiments, the artificial reality system environment 100 includes more, fewer, or different components than shown in FIG. 1. In some embodiments, the computing devices 110A, 110B communicate with the access point 105 through wireless links 102A, 102B (e.g., interlinks), respectively. In some embodiments, the computing device 110A communicates with the HWD 150A through a wireless link 125A (e.g., intralink), and the computing device 110B communicates with the HWD 150B through a wireless link 125B (e.g., intralink). In some embodiments, functionality of one or more components of the artificial reality system environment 100 can be distributed among the components in a different manner than is described here. For example, some of the functionality of the computing device 110 may be performed by the HWD 150. For example, some of the functionality of the HWD 150 may be performed by the computing device 110.

In some embodiments, the HWD 150 is an electronic component that can be worn by a user and can present or provide an artificial reality experience to the user. The HWD 150 may be referred to as, include, or be part of a head mounted display (HMD), head mounted device (HMD), head wearable device (HWD), head worn display (HWD) or head worn device (HWD). The HWD 150 may render one or more images, video, audio, or some combination thereof to provide the artificial reality experience to the user. In some embodiments, audio is presented via an external device (e.g., speakers and/or headphones) that receives audio information from the HWD 150, the computing device 110, or both, and presents audio based on the audio information. In some embodiments, the HWD 150 includes sensors 155, a wireless interface 165, a processor 170, and a display 175. These components may operate together to detect a location of the HWD 150 and a gaze direction of the user wearing the HWD 150, and render an image of a view within the artificial reality corresponding to the detected location and/or orientation of the HWD 150. In other embodiments, the HWD 150 includes more, fewer, or different components than shown in FIG. 1.

In some embodiments, the sensors 155 include electronic components or a combination of electronic components and software components that detects a location and an orientation of the HWD 150. Examples of the sensors 155 can include: one or more imaging sensors, one or more accelerometers, one or more gyroscopes, one or more magnetometers, or another suitable type of sensor that detects motion and/or location. For example, one or more accelerometers can measure translational movement (e.g., forward/back, up/down, left/right) and one or more gyroscopes can measure rotational movement (e.g., pitch, yaw, roll). In some embodiments, the sensors 155 detect the translational movement and the rotational movement, and determine an orientation and location of the HWD 150. In one aspect, the sensors 155 can detect the translational movement and the rotational movement with respect to a previous orientation and location of the HWD 150, and determine a new orientation and/or location of the HWD 150 by accumulating or integrating the detected translational movement and/or the rotational movement. Assuming for an example that the HWD 150 is oriented in a direction 25 degrees from a reference direction, in response to detecting that the HWD 150 has rotated 20 degrees, the sensors 155 may determine that the HWD 150 now faces or is oriented in a direction 45 degrees from the reference direction. Assuming for another example that the HWD 150 was located two feet away from a reference point in a first direction, in response to detecting that the HWD 150 has moved three feet in a second direction, the sensors 155 may determine that the HWD 150 is now located at a vector multiplication of the two feet in the first direction and the three feet in the second direction.

In some embodiments, the wireless interface 165 includes an electronic component or a combination of an electronic component and a software component that communicates with the computing device 110. In some embodiments, the wireless interface 165 includes or is embodied as a transceiver for transmitting and receiving data through a wireless medium. The wireless interface 165 may communicate with a wireless interface 115 of a corresponding computing device 110 through a wireless link 125 (e.g., intralink). The wireless interface 165 may also communicate with the access point 105 through a wireless link (e.g., interlink). Examples of the wireless link 125 include a near field communication link, Wi-Fi direct, Bluetooth, or any wireless communication link. In some embodiments, the wireless link 125 may include one or more ultra-wideband communication links, as described in greater detail below. Through the wireless link 125, the wireless interface 165 may transmit to the computing device 110 data indicating the determined location and/or orientation of the HWD 150, the determined gaze direction of the user, and/or hand tracking measurement. Moreover, through the wireless link 125, the wireless interface 165 may receive from the computing device 110 image data indicating or corresponding to an image to be rendered.

In some embodiments, the processor 170 includes an electronic component or a combination of an electronic component and a software component that generates one or more images for display, for example, according to a change in view of the space of the artificial reality. In some embodiments, the processor 170 is implemented as one or more graphical processing units (GPUs), one or more central processing unit (CPUs), or a combination of them that can execute instructions to perform various functions described herein. The processor 170 may receive, through the wireless interface 165, image data describing an image of artificial reality to be rendered, and render the image through the display 175. In some embodiments, the image data from the computing device 110 may be encoded, and the processor 170 may decode the image data to render the image. In some embodiments, the processor 170 receives, from the computing device 110 through the wireless interface 165, object information indicating virtual objects in the artificial reality space and depth information indicating depth (or distances from the HWD 150) of the virtual objects. In one aspect, according to the image of the artificial reality, object information, depth information from the computing device 110, and/or updated sensor measurements from the sensors 155, the processor 170 may perform shading, reprojection, and/or blending to update the image of the artificial reality to correspond to the updated location and/or orientation of the HWD 150.

In some embodiments, the display 175 is an electronic component that displays an image. The display 175 may, for example, be a liquid crystal display or an organic light emitting diode display. The display 175 may be a transparent display that allows the user to see through. In some embodiments, when the HWD 150 is worn by a user, the display 175 is located proximate (e.g., less than 3 inches) to the user's eyes. In one aspect, the display 175 emits or projects light towards the user's eyes according to image generated by the processor 170. The HWD 150 may include a lens that allows the user to see the display 175 in a close proximity.

In some embodiments, the processor 170 performs compensation to compensate for any distortions or aberrations. In one aspect, the lens introduces optical aberrations such as a chromatic aberration, a pin-cushion distortion, barrel distortion, etc. The processor 170 may determine a compensation (e.g., predistortion) to apply to the image to be rendered to compensate for the distortions caused by the lens, and apply the determined compensation to the image from the processor 170. The processor 170 may provide the predistorted image to the display 175.

In some embodiments, the computing device 110 is an electronic component or a combination of an electronic component and a software component that provides content to be rendered to the HWD 150. The computing device 110 may be embodied as a mobile device (e.g., smart phone, tablet PC, laptop, etc.). The computing device 110 may operate as a soft access point. In one aspect, the computing device 110 includes a wireless interface 115 and a processor 118. These components may operate together to determine a view (e.g., a FOV of the user) of the artificial reality corresponding to the location of the HWD 150 and the gaze direction of the user of the HWD 150, and can generate image data indicating an image of the artificial reality corresponding to the determined view. The computing device 110 may also communicate with the access point 105, and may obtain AR/VR content from the access point 105, for example, through the wireless link 102 (e.g., interlink). The computing device 110 may receive sensor measurement indicating location and the gaze direction of the user of the HWD 150 and provide the image data to the HWD 150 for presentation of the artificial reality, for example, through the wireless link 125 (e.g., intralink). In other embodiments, the computing device 110 includes more, fewer, or different components than shown in FIG. 1.

In some embodiments, the wireless interface 115 is an electronic component or a combination of an electronic component and a software component that communicates with the HWD 150, the access point 105, other computing device 110, or any combination of them. In some embodiments, the wireless interface 115 includes or is embodied as a transceiver for transmitting and receiving data through a wireless medium. The wireless interface 115 may be a counterpart component to the wireless interface 165 to communicate with the HWD 150 through a wireless link 125 (e.g., intralink). The wireless interface 115 may also include a component to communicate with the access point 105 through a wireless link 102 (e.g., interlink). Examples of wireless link 102 include a cellular communication link, a near field communication link, Wi-Fi, Bluetooth, 60 GHz wireless link, ultra-wideband link, or any wireless communication link. The wireless interface 115 may also include a component to communicate with a different computing device 110 through a wireless link 185. Examples of the wireless link 185 include a near field communication link, Wi-Fi direct, Bluetooth, ultra-wideband link, or any wireless communication link. Through the wireless link 102 (e.g., interlink), the wireless interface 115 may obtain AR/VR content, or other content from the access point 105. Through the wireless link 125 (e.g., intralink), the wireless interface 115 may receive from the HWD 150 data indicating the determined location and/or orientation of the HWD 150, the determined gaze direction of the user, and/or the hand tracking measurement. Moreover, through the wireless link 125 (e.g., intralink), the wireless interface 115 may transmit to the HWD 150 image data describing an image to be rendered. Through the wireless link 185, the wireless interface 115 may receive or transmit information indicating the wireless link 125 (e.g., channel, timing) between the computing device 110 and the HWD 150. According to the information indicating the wireless link 125, computing devices 110 may coordinate or schedule operations to avoid interference or collisions.

The processor 118 can include or correspond to a component that generates content to be rendered according to the location and/or orientation of the HWD 150. In some embodiments, the processor 118 includes or is embodied as one or more central processing units, graphics processing units, image processors, or any processors for generating images of the artificial reality. In some embodiments, the processor 118 may incorporate the gaze direction of the user of the HWD 150 and a user interaction in the artificial reality to generate the content to be rendered. In one aspect, the processor 118 determines a view of the artificial reality according to the location and/or orientation of the HWD 150. For example, the processor 118 maps the location of the HWD 150 in a physical space to a location within an artificial reality space, and determines a view of the artificial reality space along a direction corresponding to the mapped orientation from the mapped location in the artificial reality space. The processor 118 may generate image data describing an image of the determined view of the artificial reality space, and transmit the image data to the HWD 150 through the wireless interface 115. The processor 118 may encode the image data describing the image, and can transmit the encoded data to the HWD 150. In some embodiments, the processor 118 generates and provides the image data to the HWD 150 periodically (e.g., every 11 ms or 16 ms).

In some embodiments, the processors 118, 170 may configure or cause the wireless interfaces 115, 165 to toggle, transition, cycle or switch between a sleep mode and a wake up mode. In the wake up mode, the processor 118 may enable the wireless interface 115 and the processor 170 may enable the wireless interface 165, such that the wireless interfaces 115, 165 may exchange data. In the sleep mode, the processor 118 may disable (e.g., implement low power operation in) the wireless interface 115 and the processor 170 may disable the wireless interface 165, such that the wireless interfaces 115, 165 may not consume power or may reduce power consumption. The processors 118, 170 may schedule the wireless interfaces 115, 165 to switch between the sleep mode and the wake up mode periodically every frame time (e.g., 11 ms or 16 ms). For example, the wireless interfaces 115, 165 may operate in the wake up mode for 2 ms of the frame time, and the wireless interfaces 115, 165 may operate in the sleep mode for the remainder (e.g., 9 ms) of the frame time. By disabling the wireless interfaces 115, 165 in the sleep mode, power consumption of the computing device 110 and the HWD 150 can be reduced.

Systems and Methods for Ultra-Wideband Ranging

In various embodiments, the devices in the environments described above may operate or otherwise use components which leverage communications in the ultra-wideband (UWB) spectrum. Disclosed herein are embodiments related to devices, systems, and methods operating in the ultra-wideband (UWB) spectrum. In various embodiments, UWB devices operate in the 3-10 GHz unlicensed spectrum using 500+ MHz channels which may require low power for transmission. Using simple modulation and spread spectrum, UWB devices may achieve reasonable resistance to Wi-Fi and Bluetooth interference (as well as resistance to interference with other UWB devices located in the environment) for very low data rates (e.g., 10 s to 100 s Kbps)

and may have large processing gains. However, for higher data rates (e.g., several Mbps), the processing gains may not be sufficient to overcome co-channel interference from Wi-Fi or Bluetooth. According to the embodiments described herein, the systems and methods described herein may operate in frequency bands that do not overlap with Wi-Fi and Bluetooth, but may have good global availability based on regulatory requirements. Since regulatory requirements make the 7-8 GHz spectrum the most widely available globally (and Wi-Fi is not present in this spectrum), the 7-8 GHz spectrum may operate satisfactory both based on co-channel interference and processing gains.

Some implementations of UWB may focus on precision ranging and security. As UWB employs relatively simple modulation, it may be implemented at low cost and low power consumption. In AR/VR applications (or in other applications and use cases), link budget calculations for an AR/VR controller link indicate that the systems and methods described herein may be configured for effective data throughput ranging from ~2 to 31 Mbps (e.g., with 31 Mbps being the maximum possible rate in the latest 802.15.4z standard), which may depend on body loss assumptions.

The systems and methods described herein may be used or leveraged in various AR/VR use cases and applications, as well as in other use cases and applications (such as communications between mobile devices and vehicles, a remote control device and a video recording device, and so forth). Various applications, use cases, and further implementations of the systems and methods described herein are described in greater detail below.

Figure 3:
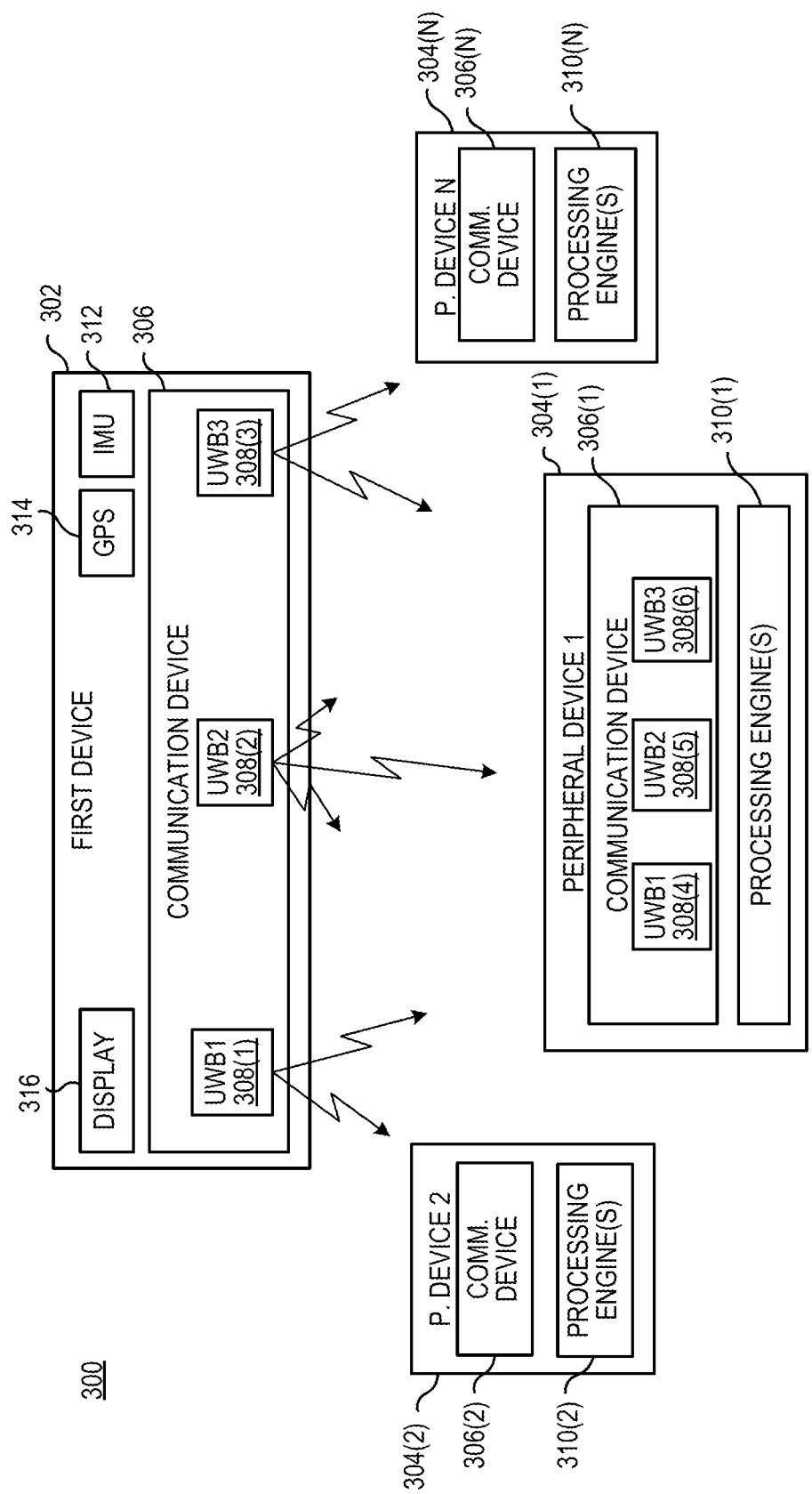
FIG. 3 is a block diagram of an artificial reality environment, according to an example implementation of the present disclosure.

Referring now to FIG. 3, depicted is a block diagram of an artificial reality environment 300. The artificial reality environment 300 is shown to include a first device 302 and one or more peripheral devices 304(1)-304(N) (also referred to as "peripheral device 304" or "device 304"). The first device 302 and peripheral device(s) 304 may each include a communication device 306 including a plurality of UWB devices 308. A set of UWB devices 308 may be spatially positioned/located (e.g., spaced out) relative to each other on different locations on/in the first device 302 or the peripheral device 304, so as to maximize UWB coverage and/or to enhance/enable specific functionalities. The UWB devices 308 may be or include antennas, sensors, or other devices and components designed or implemented to transmit and receive data or signals in the UWB spectrum (e.g., between 3.1 GHz and 10.6 GHz) and/or using UWB communication protocol. In some embodiments, one or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308.

As noted above, the environment 300 may include a first device 302. The first device 302 may be or include a wearable device, such as the HWD 150 described above, a smart watch, AR glasses, or the like. In some embodiments, the first device 302 may include a mobile device (e.g., a smart phone, tablet, stage/console device, or other computing device), a remote control device, a smart key, etc. The first device 302 may be communicably coupled with various other devices 304 located in the environment 300. For example, the first device 302 may be communicably coupled to one or more of the peripheral devices 304 located in the environment 300. The peripheral devices 304 may be or include the computing device 110 described above, a device similar to the first device 302 (e.g., a HWD 150, a smart watch, mobile device, remote control device, a smart key, etc.), an automobile or other vehicle, a beacon transmitting device located in the environment 300, a smart home device (e.g., a smart television, a digital assistant device, a smart speaker, a video conferencing device, etc.), a smart tag configured for positioning on various devices, etc. In some embodiments, the first device 302 may be associated with a first entity or user and the peripheral devices 304 may be associated with a second entity or user (e.g., a separate member of a household, or a person/entity unrelated to the first entity).

In some embodiments, the first device 302 may be communicably coupled with the peripheral device(s) 304 following a pairing or handshaking process. For example, the first device 302 may be configured to exchange handshake packet(s) with the peripheral device(s) 304, to pair (e.g., establish a specific or dedicated connection or link between) the first device 302 and the peripheral device 304. The handshake packet(s) may be exchanged via the UWB devices 308, or via another wireless link 125 (such as one or more of the wireless links 125 described above). Following pairing, the first device 302 and peripheral device(s) 304 may be configured to transmit, receive, or otherwise exchange UWB data or UWB signals using the respective UWB devices 308 on the first device 302 and/or peripheral device 304. In some embodiments, the first device 302 may be configured to establish a communications link with a peripheral device 304 (e.g., without any device pairing). For example, the first device 302 may be configured to detect, monitor, and/or identify peripheral devices 304 located in the environment using UWB signals received from the peripheral devices 304 within a certain distance of the first device 302, by identifying peripheral devices 304 which are connected to a shared Wi-Fi network (e.g., the same Wi-Fi network to which the first device 302 is connected), etc. In these and other embodiments, the first device 302 may be configured to transmit, send, receive, or otherwise exchange UWB data or signals with the peripheral device 304.

The first device 302 and/or the peripheral device 304 may be configured to determine a range (e.g., a spatial distance, separation) between the devices 302, 304. The first device 302 may be configured to send, broadcast, or otherwise transmit a UWB signal (e.g., a challenge signal). The first device 302 may transmit the UWB signal using one of the UWB devices 308 of the communication device 306 on the first device 302. The UWB device 308 may transmit the UWB signal in the UWB spectrum. The UWB signal may have a high bandwidth (e.g., 500 MHz). As such, the UWB device 308 may be configured to transmit the UWB signal in the UWB spectrum (e.g., between 3.1 GHz and 10.6 GHz) and having a high bandwidth (e.g., 500 MHz). The UWB signal from the first device 302 may be detectable by other devices within a certain range of the first device 302 (e.g., devices having a line of sight (LOS) within 200 m of the first device 302). As such, the UWB signal may be more accurate for detecting range between devices than other types of signals or ranging technology.

The peripheral device 304 may be configured to receive or otherwise detect the UWB signal from the first device 302. The peripheral device 304 may be configured to receive the UWB signal from the first device 302 via one of the UWB devices 308 on the peripheral device 304. The peripheral device 304 may be configured to broadcast, send, or otherwise transmit a UWB response signal responsive to detecting the UWB signal from the first device 302. The peripheral device 304 may be configured to transmit the UWB response signal using one of the UWB devices 308 of the communication device 306 on the peripheral device 304. The UWB response signal may be similar to the UWB signal sent from the first device 302.

The first device 302 may be configured to detect, compute, calculate, or otherwise determine a time of flight (TOF) based on the UWB signal and the UWB response signal. The TOF may be a time or duration between a time in which a signal (e.g., the UWB signal) is transmitted by the first device 302 and a time in which the signal is received by the peripheral device 304. The first device 302 may be configured to determine or calculate the TOF between the first device 302 and the peripheral device 304 based on a difference between the first time and the second time (e.g., divided by two).

In some embodiments, the first device 302 may be configured to determine the range (or distance) between the first device 302 and the peripheral device 304 based on the TOF. For example, the first device 302 may be configured to compute the range or distance between the first device 302 and the peripheral device 304 by multiplying the TOF and the speed of light (e.g., TOF×c). In some embodiments, the peripheral device 304 (or another device in the environment 400) may be configured to compute the range or distance between the first device 302 and peripheral device 304. For example, the first device 302 may be configured to transmit, send, or otherwise provide the TOF to the peripheral device 304 (or other device), and the peripheral device 304 (or other device) may be configured to compute the range between the first device 302 and peripheral device 304 based on the TOF, as described above. Additional details regarding range determination is described in greater detail below.

Data Transmission within Ultra-Wideband Ranging Protocol

In one aspect, the systems and methods described herein may incorporate data transmission within an ultra-wideband (UWB) ranging protocol. The systems and methods described herein may incorporate or integrate data transmission packets within/between ranging packets (e.g., frames, transmissions). The systems and methods described herein may provide data transmission packets within separate slots of a ranging protocol/process. In some embodiments, the systems and methods described herein may facilitate data communications between devices in an AR/VR environment. For example, the systems and methods described herein may facilitate data communications between a mobile device and a video conferencing device (e.g., for controlling the video conferencing device using the mobile device). As another example, the systems and methods described herein may facilitate data communications between a VR device and a console (e.g., for transmitting motion data from the VR device to the console, and map data from the console to the VR device). As yet another example, the systems and methods described herein may facilitate data communications between a mobile device or smart key and a vehicle (e.g., to automatically unlock the vehicle, remotely start the vehicle, etc.). Various implementations and embodiments are described in greater detail below.

Figure 4:
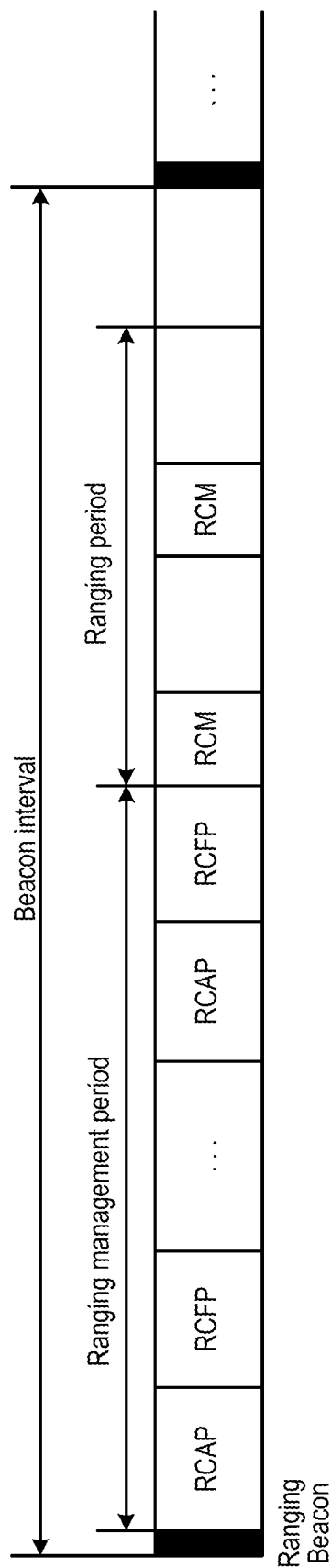
FIG. 4 is a diagram showing enabling/disabling beacon intervals based on a use case, according to an example implementation of the present disclosure.

Referring now to FIG. 4, depicted is a diagram showing enabling/disabling beacon intervals based on a use case, according to an example implementation of the present disclosure. As shown in FIG. 4, the systems and methods described herein may (e.g., use specific types of beacons to) enable or disable one or more beacon intervals that can support data communication, based on a particular use case. For example, a beacon interval may include a ranging management period, which includes slots for ranging contention access periods (RCAPs) and slots for ranging contention free periods (RCFPs). The beacon interval may include a ranging period including slots for ranging and communication (RCM). The beacon interval may be defined consistent with, or as set forth in IEEE 802.15.4z (clause 6.2.11). The ranging schedule time unit (RSTU) for the beacon interval may be equal to 416 chips (or approximately 833 ns for high rate pulse repetition frequency (HRP)).

Referring now to FIG. 5, depicted is a diagram of a beacon frame format, according to an example implementation of the present disclosure. As shown in FIG. 5, a beacon frame format may serve to synchronize devices (e.g., devices 302, 304) without Bluetooth low energy (BLE) mechanism for instance. The beacon frame format may identify devices on a personal area network (PAN) and can describe structures of superframes (or blocks). The beacon frame format may include a MAC header (MHR), a MAC payload, and MAC footer (MFR). The MHR may include a frame control section, a sequence number section, an addressing fields section, and/or an auxiliary security header. The MAC payload may include a superframe specification, guaranteed timeslot (GTS) information, a pending address, and/or a beacon payload. In some embodiments, the superframe specification, GTS information, and/or pending address may be mandatory fields within the beacon frame format. The MFR may include a frame check sequence (FCS).

Figure 6:
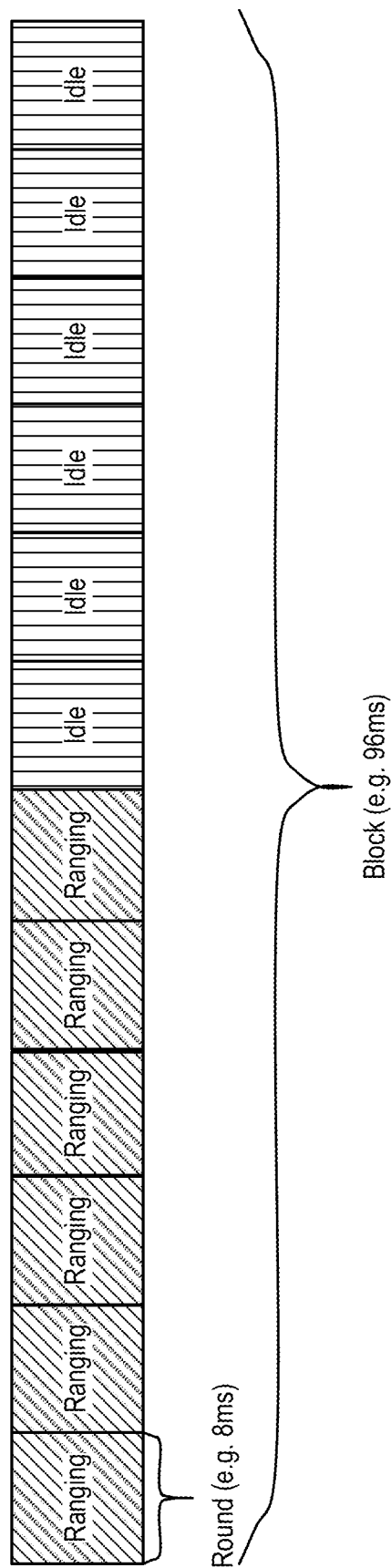
FIG. 6 is a diagram of a UWB block and/or round specification, according to an example implementation of the present disclosure.

Referring now to FIG. 6, depicted is a diagram of a UWB-based block and/or round specification, according to an example implementation of the present disclosure. For example, this can be implemented/adopted for certain applications, for instance as a car connectivity consortium (CCC) specification. As shown in the specification from FIG. 6, a ranging block may include a number of ranging rounds and a number of idle rounds. Each round may be between 6 ms and 96 ms, and the block may be at least 96 ms (with other possibilities of 192 ms, 288 ms, and so forth). The ranging block may be subdivided into any number of ranging rounds and idle rounds, which may have a constant or variable duration. The ranging rounds vs. idle rounds may define a duty cycle for the block. For example, if ranging were performed in each of the ranging rounds in FIG. 6, the block may have a duty cycle of 50%. Data communication can be introduced in the block and/or in certain round(s), for example in at least some of the idle rounds.

Figure 7:
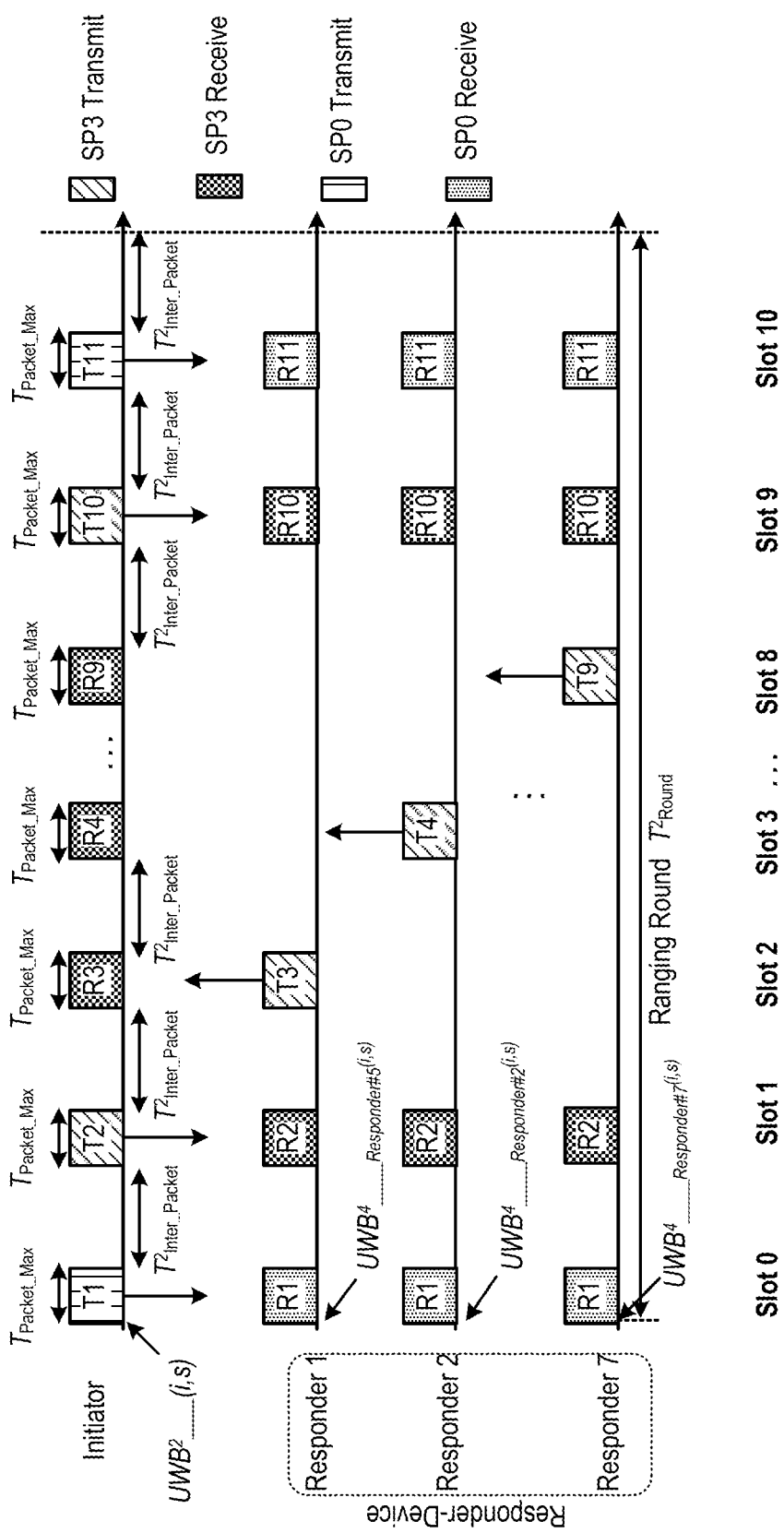
FIG. 7 is a diagram of a ranging round, according to an example implementation of the present disclosure.

Referring now to FIG. 7, depicted is a diagram of a ranging round, according to an example implementation of the present disclosure. The diagram shown in FIG. 7 may illustrate/depict a ranging round performed in one of the ranging rounds shown in FIG. 6. The ranging round may include a number of slots (e.g., slot 0-slot 10) in which packets/frames are sent between an initiator and a responder. In the diagram shown in FIG. 7, at the first slot (slot 0), an initiator (e.g., a first device 302, which may be a mobile device) may send an initial packet (T1) to any number of responder devices (or UWB devices 308 of the responder device). The initial packet T1 may be an SP0 frame, or a pre-poll message, which indicates that another ranging packet is to be transmitted by the initiator to the responder devices. Following the initial packet (T1), the initiator may send a second packet (T2) to the responder devices (at slot 1). The second packet T2 may be an SP3 packet, or a ranging packet which does not include any data. Each of the responder devices may transmit a response ranging packet (e.g., T3, T4, ... T9) back to the initiator (e.g., at slots 3-8), which may similarly be SP3 packets, and may not include any data. Once the initiator receives the response ranging packet (T3, T4, T9) from the responder devices, the initiator may transmit a ranging packet (T10) (e.g., at slot 9). The T10 packet may specify that the initiator received the response ranging packet (T3, T4, T9) from the responder devices, and/or indicates that the initiator is to transmit a final ranging packet (T11). Additionally, the responder device may use the packet T10 received from the initiator to validate the data from the final ranging packet (T11). The initiator may transmit a final ranging packet (T11) (e.g., at slot 10). The ranging packet T11 may in some embodiments specify a difference between a timestamp in which the initiator transmitted the second packet T2 and a timestamp in which the initiator receives a respective response ranging packet (T3, T4, T9). The ranging packet T11 may in certain embodiments specify a difference between adjacent timestamps corresponding to adjacent packets from packets T2, T3, T4, . . . T9. Since the ranging packet T10 and response ranging packets T3, T4, and T9 do not contain data, these ranging packets may be reliable (e.g., with a sensitivity of −80 dB), than packet T11 for instance. However, since the ranging packet T11 includes data (e.g., corresponding to the timestamps), the ranging packet T11 may be less reliable (e.g., with a sensitivity of −85 dB), e.g., relative to some of the other packets.

Figure 8:
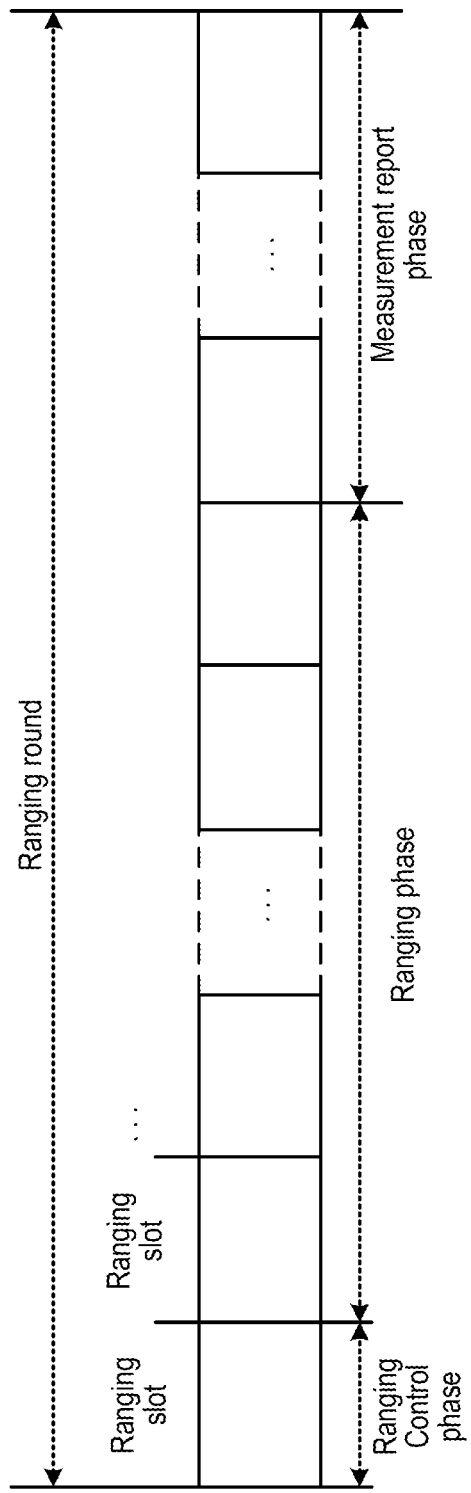
FIG. 8 is another diagram of a ranging round, according to an example implementation of the present disclosure.

Referring now to FIG. 8, depicted is another diagram of a ranging round, according to an example implementation of the present disclosure. The ranging round shown in FIG. 8 is similar in some respects to the ranging round shown in FIG. 7. Specifically, the ranging round shown in FIG. 8 shows a ranging control phase (similar to slot 0), a ranging phase (similar to slots 2-9), and a measurement report phase (similar to slot 10). The slot duration and number of slots may be modified or changed between ranging rounds (e.g., by the initiator sending an RCM frame with a modified ranging round configuration).

Figure 9:
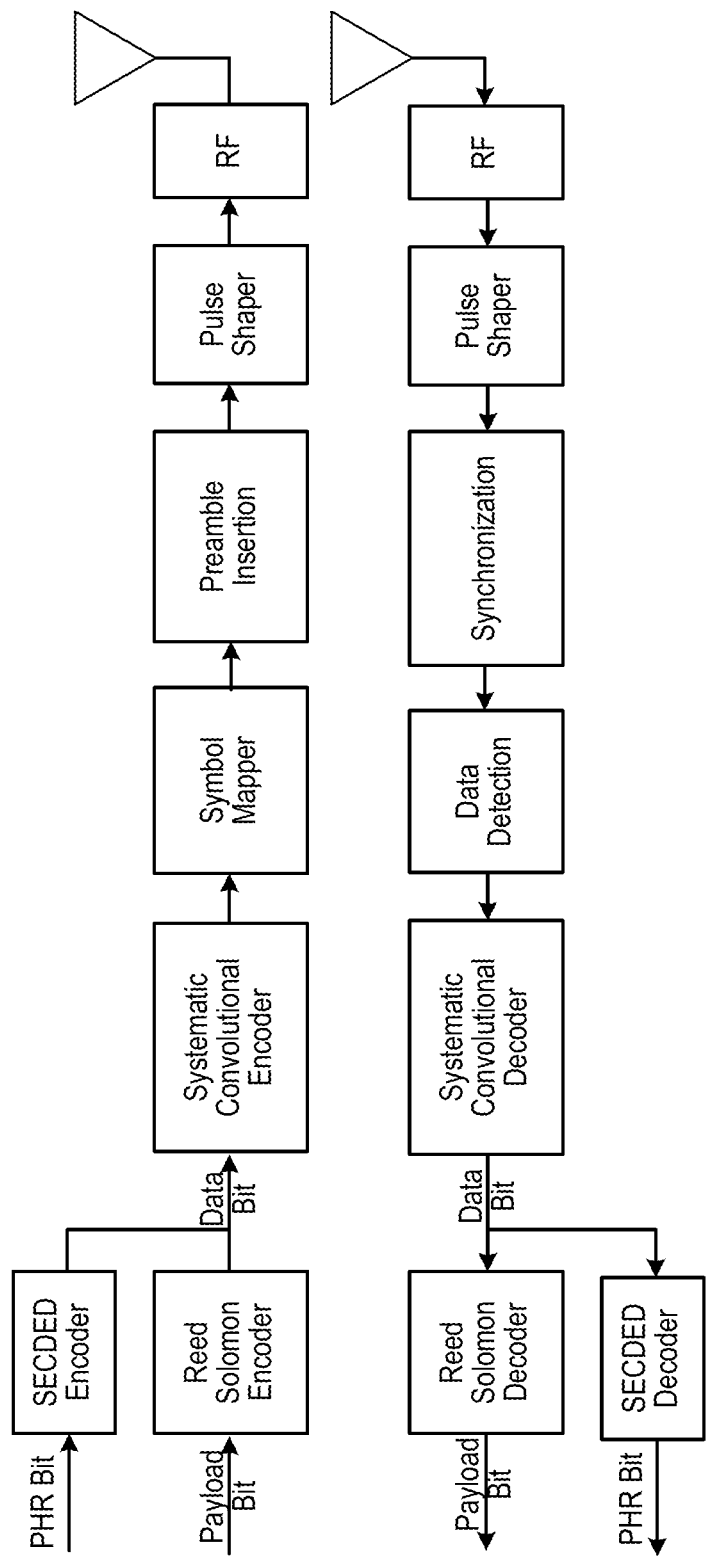
FIG. 9 is a block diagram of a data processing and communication system, according to an example implementation of the present disclosure.
Figure 10A:
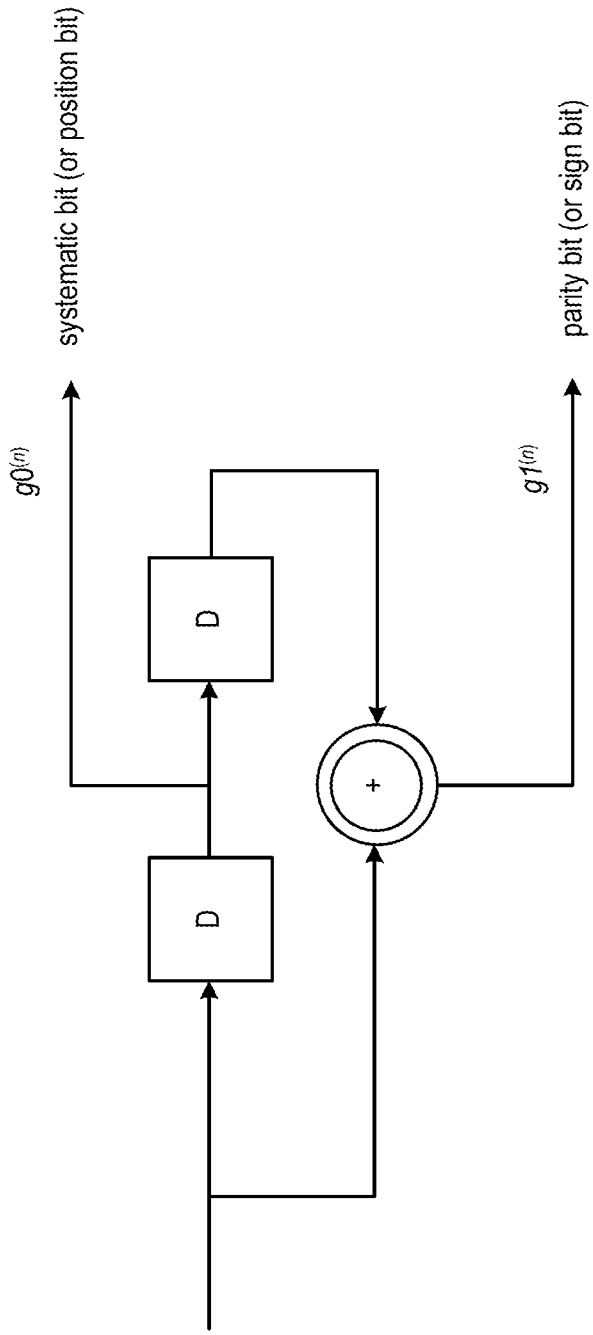
FIG. 10A and FIG. 10B are diagrams of encoders that can be used in the system of FIG. 9, according to an example implementation of the present disclosure.
Figure 10B:
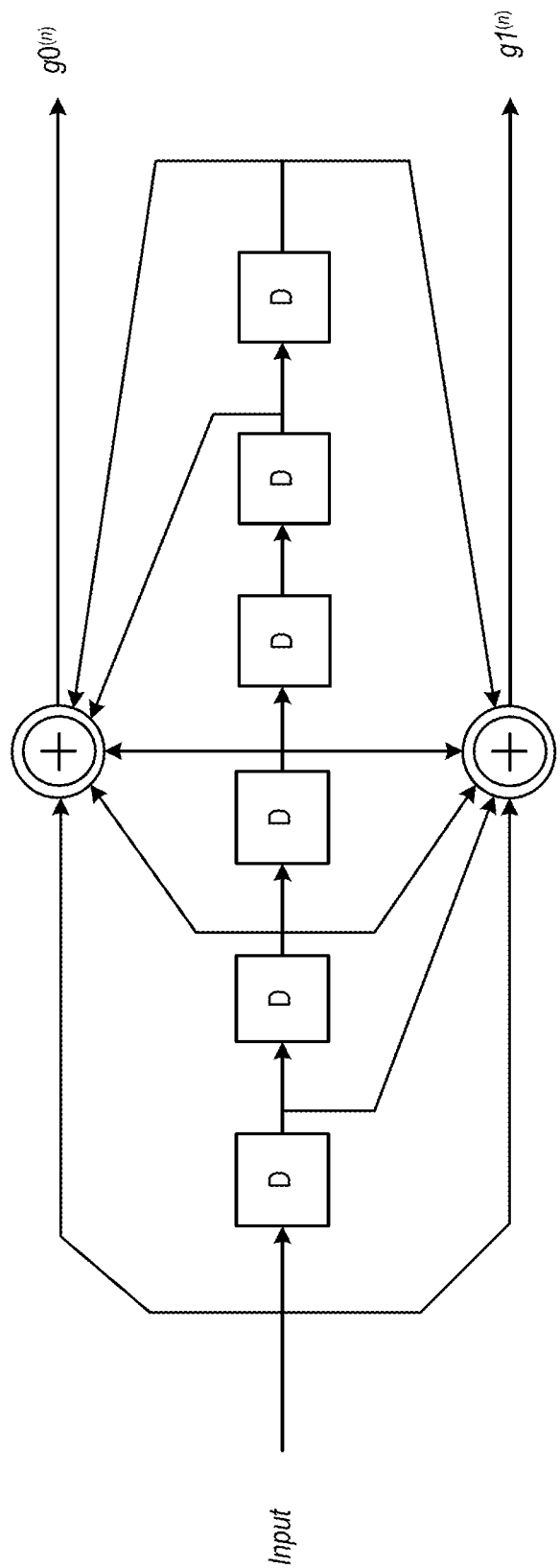

Referring now to FIG. 9 and FIG. 10, depicted is a block diagram of a data processing and communication system, and a diagram of encoders using convolutional codes which can be used in the system of FIG. 9, respectively, according to example implementations of the present disclosure. In the system shown in FIG. 9, data may be encoded by an initiator and decoded at the responder (and vice versa). At the initiator, bits or data may be sent to a Reed Solomon encoder for encoding and an SECDED encoder for the Physical Layer Header (PHR) bit. The encoded data may then be transmitted, sent, or otherwise provided to a systematic convolutional encoder (such as one of the encoders shown in FIG. 10). The convolutional encoder may provide a further encoded data stream to a symbol mapper, which then performs a symbol mapping process to the further encoded data stream. The symbol mapper may provide data to a preamble insertion component which inserts any preamble data into the data stream. The data stream is then provided to a pulse shaper, and then output by the UWB device 308 of the initiator. When the signal is received at a responder, the responder may perform an inverse of the above-mentioned process (e.g., pulse shaping, synchronization, data detection, followed by a systematic convolutional decoding, and a Reed Solomon decoding and SECDED decoding. As shown in FIG. 10, the convolutional codes may include a K=3 encoder, or a K=7 encoder.

Figure 11:
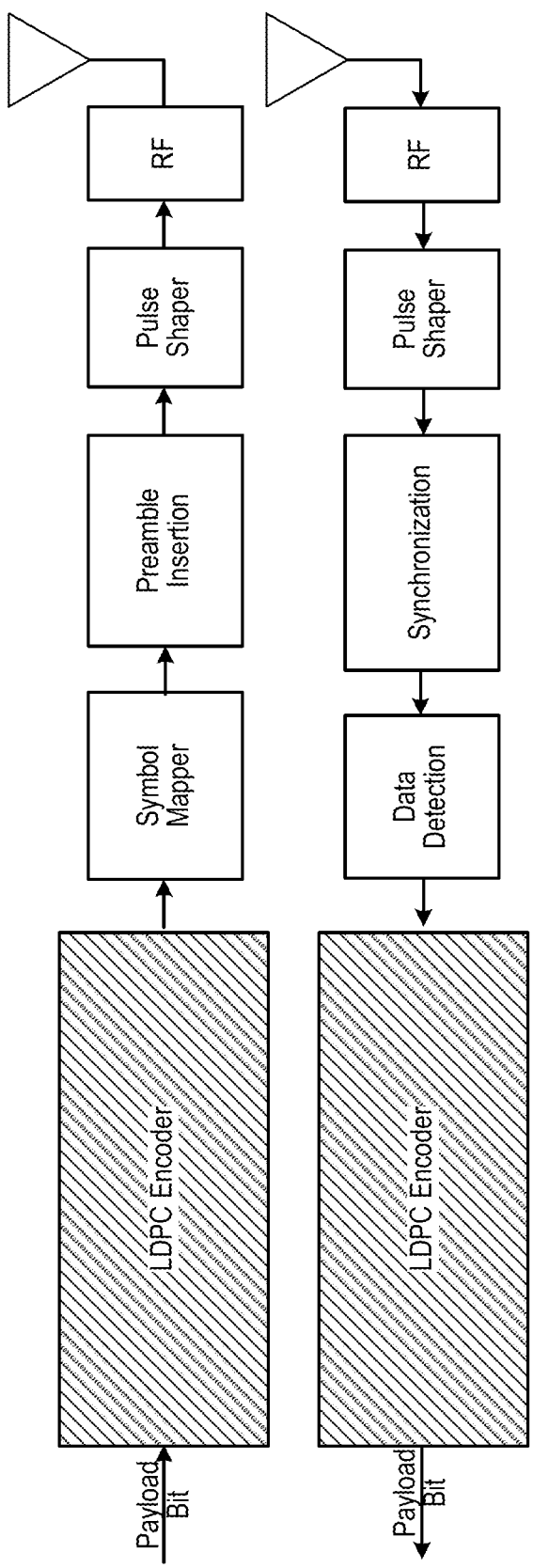
FIG. 11 is a block diagram of a data processing and communication system, according to an example implementation of the present disclosure.

Referring now to FIG. 11 and FIG. 12, depicted is a block diagram of a data processing and communication system, and example codes which could be used in the system of FIG. 11, respectively, according to example implementations of the present disclosure. In the embodiments described herein, the systems and methods described herein may apply a low density parity check (LDPC) encoder and decoder in the time domain. The LDPC encoder and decoder may be more robust than Reed Solomon based processing. The LDPC encoder and decoder may replace the Reed Solomon/SECDED encoders/decoders, along with the systematic convolution encoder/decoder shown in FIG. 9 and FIG. 10. The embodiments described herein may improve performance in data transmission between the UWB devices 308 at the initiator and responder. In some embodiments, the LDPC encoder (and decoder) may switch between LDPC codeword block lengths shown in FIG. 12. For example, the LDPC encoder and decoder may select an LDPC codeword block length based on a packet size/length (e.g., where the LDPC encoder may use the 1944 codeword block length for long packets, and the 1296 or 648 code word block lengths for shorter packets). In this regard, the LDPC encoder may dynamically select a codeword block length based on packet size or length (e.g., select a longest codeword block length applicable to packet traffic). The LDPC encoder may default to select the long codeword block length for increased security and robustness of the packets. Such embodiments may increase the reliability of packets which include data (e.g., to a sensitivity of approximately −80 dB).

Figure 13:
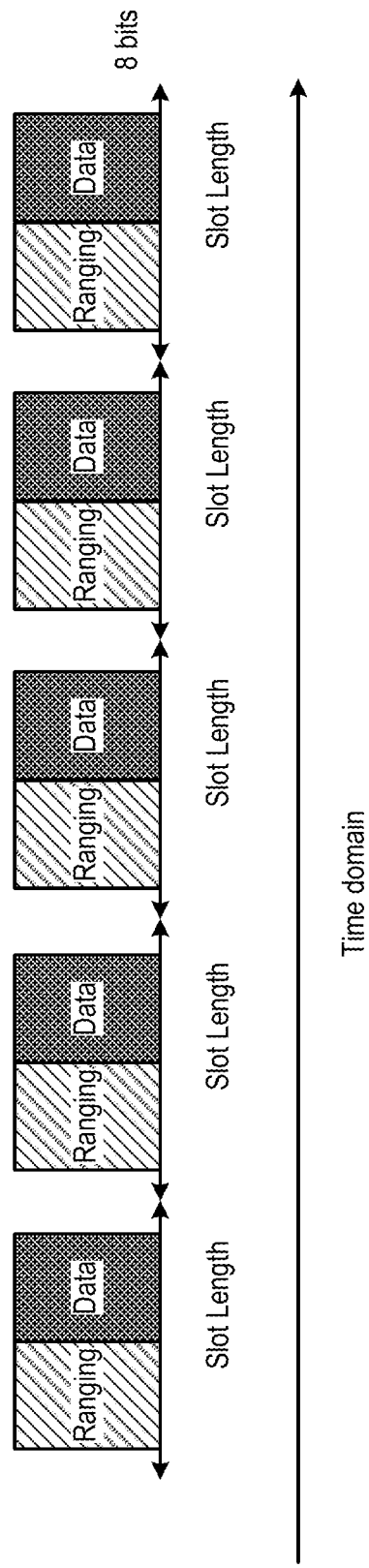
FIG. 13 is a diagram showing data communication incorporated into a ranging round, according to an example implementation of the present disclosure.

Referring now to FIG. 13, and with reference to FIG. 7, depicted is a diagram showing data communication incorporated into a ranging round, according to an example implementation of the present disclosure. With reference to FIG. 7, each of the slots (slots 0-10) may have a slot length of between 1-2 ms. However, the ranging packets transmitted between the initiator and responders may be between 200-400 μs. In the embodiments described herein, the initiator and/or responder may include or incorporate data packets in a portion of the slot outside of the ranging packet (e.g., in the 600-800 μs separate from the ranging packet). In some embodiments, the initiator and/or responder may communicate, include or incorporate data packets in slot 0 or slot 10 (e.g., within a slot in which an SP0 packet is sent by the initiator to the responder devices), in a slot corresponding to an SP1 or SP2 packet (e.g., before or after a secure timestamp (STS) payload), in or following a responder ranging packet (e.g., T3, T4, . . . T9), etc.

Figure 14:
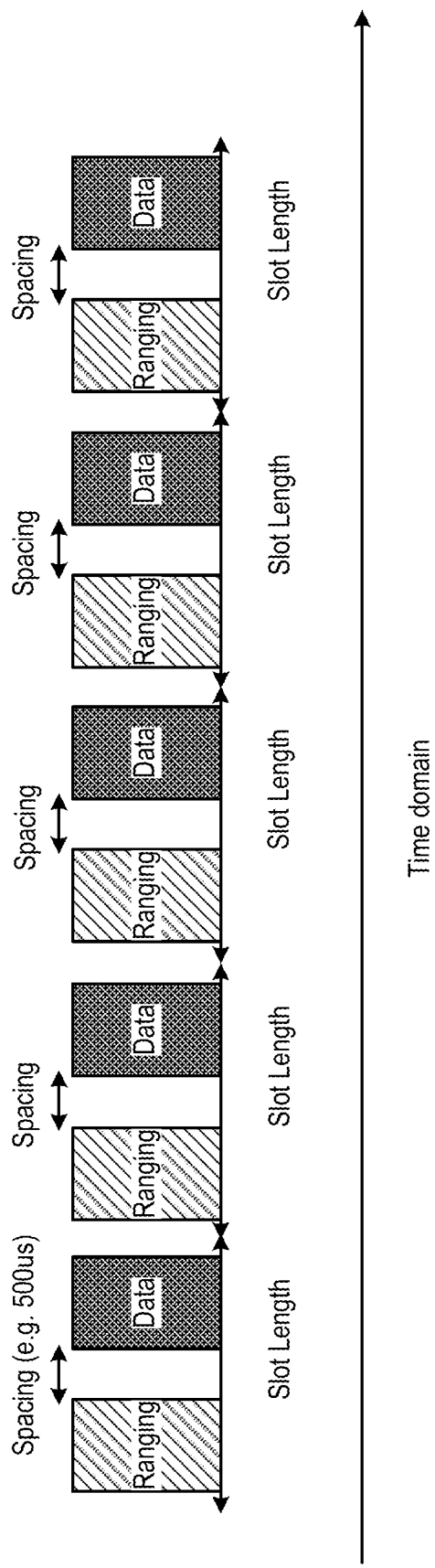
FIG. 14 is another diagram showing data communication incorporated into a ranging round, according to an example implementation of the present disclosure.

Referring now to FIG. 14, depicted is another diagram showing data communication incorporated into a ranging round, according to an example implementation of the present disclosure. The diagram shown in FIG. 0.14 is similar in some respects to the diagram shown in FIG. 13. In this embodiment, the initiator and/or responder may incorporate spacing between the ranging and data packets within a particular slot. For example, where slots each has a slot length of 2 ms, the initiator and/or responder may provide a 500 μs spacing between the ranging packet (of, for instance, 500 μs), followed by a 1 ms long data packet.

Figure 15:
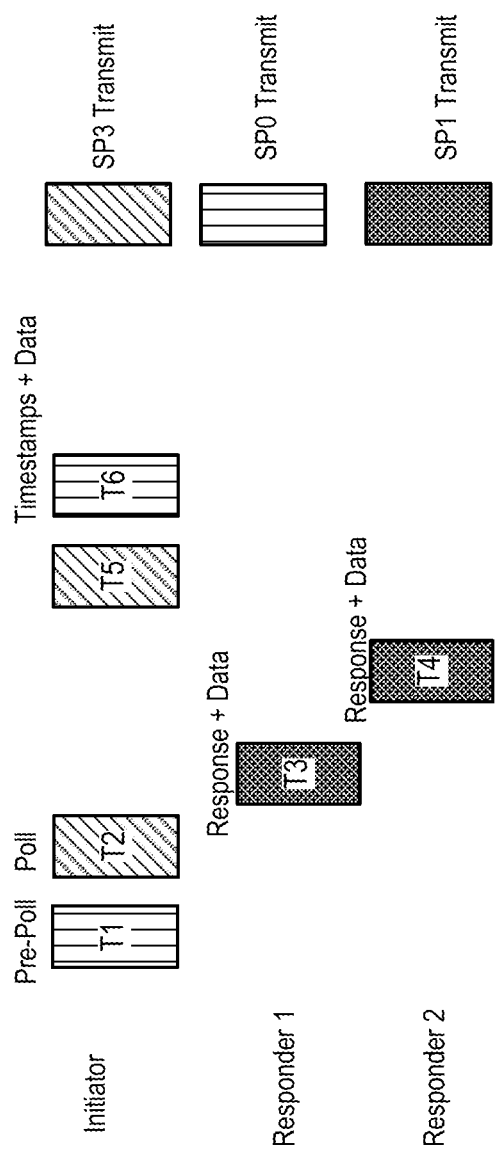
FIG. 15 is another diagram showing data communication incorporated into a ranging round, according to an example implementation of the present disclosure.

Referring now to FIG. 15, depicted is another diagram showing data communication incorporated into a ranging round, according to an example implementation of the present disclosure. In this embodiment, the initiator and/or responder may be configured to incorporate data into the ranging packets, for transmission. In this example, rather than the responders transmitting an SP3 packet (at slots 2-8 in FIG. 7, which may not include any data, the responders may instead transmit SP1 packets which include data incorporated into the SP1 packet or frame. As such, the responders may transmit data along with timestamps back to the initiator, thereby facilitating data transmission from the responder to the initiator. Similarly, the initiator may incorporate data along with the timestamp information into the T11 packet sent at slot 10. As such, the initiator may transmit data, thereby facilitating data transmission from the initiator to the responder(s).

Referring now to FIG. 16, depicted is another diagram showing data communication incorporated into a ranging round, according to an example implementation of the present disclosure. The diagram shown in FIG. 16 includes the ranging round shown in FIG. 7, in some embodiments. In certain embodiments, the ranging round may include slots (e.g., following slot 10 in FIG. 7) which are not used, based on parameters of the ranging round configuration. In the embodiment shown in FIG. 16, the initiator and/or responder may incorporate, embed, or otherwise transmit data in slots which are not being used (e.g., those slots bound by a box in the table shown in FIG. 16, such as slots following the SP0 data packet sent by the initiator at slot 10). For example, the ranging round may be 20 ms, but ranging may be performed in a portion of the ranging round (e.g., for 8 ms), and data transmission may be performed in the remaining portion of the ranging round (e.g., in the remaining 12 ms).

Figure 17:
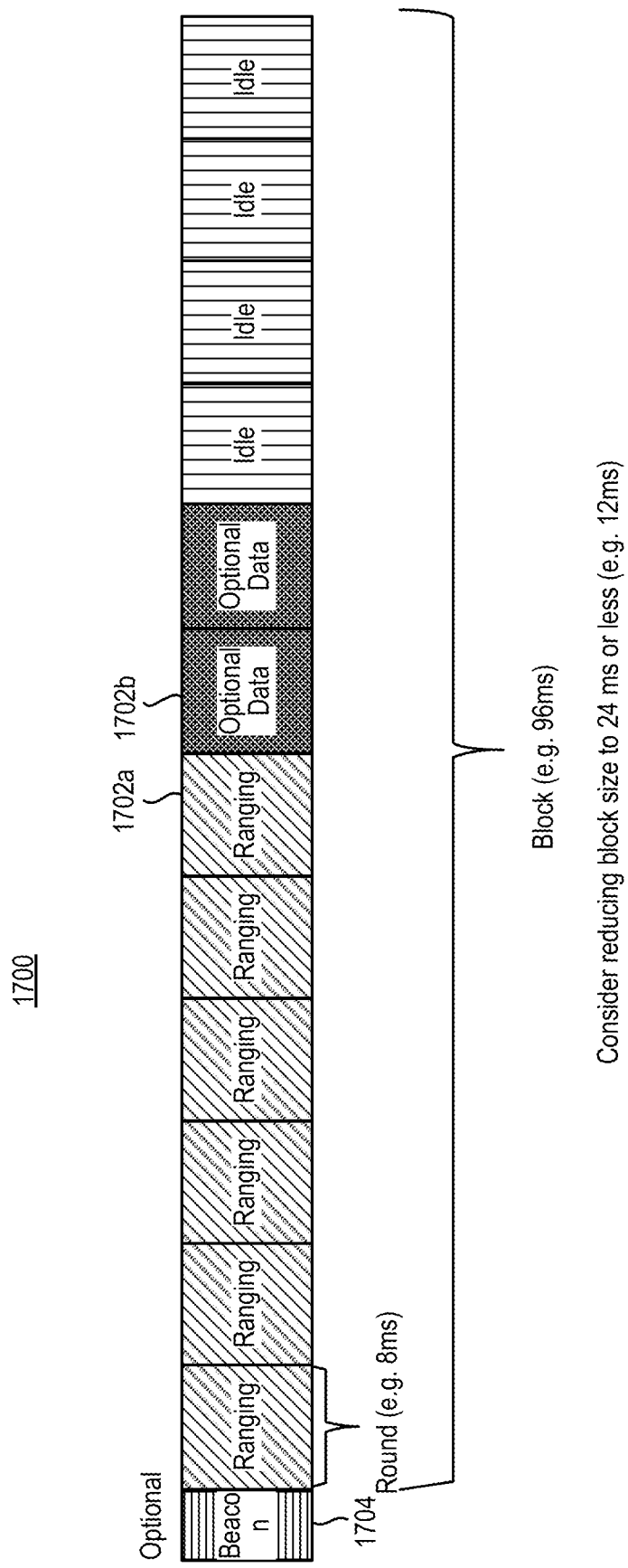
FIG. 17 is another diagram showing data communication incorporated into a UWB block, according to an example implementation of the present disclosure.

Referring now to FIG. 17, depicted is another diagram showing data communication incorporated into a ranging round, according to an example implementation of the present disclosure. In the embodiment shown in FIG. 17, the block may include both ranging and data rounds). For example, a beacon signal (referred to in greater detail below) may define or assign contention-free periods (CFPs), while also eliminating contention-access periods (CAPs). The beacon signal may negotiate, transmit, or otherwise provide/define a ranging period, a data period, and/or an idle period. In the idle period, neighboring devices may transmit with other responders (e.g., to avoid collisions and interference between devices).

Referring now to FIG. 18, depicted is a diagram of data rounds with or without acknowledgements, according to an example implementation of the present disclosure. In some implementations, within the data rounds shown in FIG. 17, the data packets/frames may be followed by acknowledgement. For example, and as shown as option 1 in FIG. 18, an initiator may transmit a data packet to a responder during a data round, and the responder may acknowledge the data packet during the data round. In some implementations, and as shown in option 2 in FIG. 18, an initiator may transmit a data packet during a data round, and the responder may forego, omit, or otherwise not provide an acknowledgement to the initiator. In some implementations, and as shown in option 3 in FIG. 18, an initiator may transmit multiple data packets to a responder (e.g., over one or multiple data rounds), and the responder may provide a block (or combined/batch) acknowledgement which acknowledges receipt of multiple data packets by the responder from the initiator. Similarly, the responder may transmit, send, or otherwise provide data packets to an initiator, and the initiator may acknowledge using one of the options described above.

Referring now to FIG. 19, depicted is a diagram of a beacon signal/frame structure, according to an example implementation of the present disclosure. The beacon signal/frame structure shown in FIG. 19 may be used by the beacon as shown in FIG. 18 for instance, for defining a particular block configuration or structure. The beacon signal structure may specify the structure of the block (e.g., the block shown in FIG. 19). For example, the beacon signal structure may include portions or sequences for a series of bits which define various information relating to the block configuration for at least device to use/apply in sending ranging and/or data transmissions. The beacon signal structure may include a frame control portion (including 16 bits for configuring the frame control), a sequencing number portion (including 8 bits for configuring the sequencing number), an addressing fields portion (which may include 32 or 80 bits for configuring the addressing fields. In some embodiments, the beacon signal structure may include 8 bit portions for defining the minimum block duration and the actual block duration, respectively. The minimum block duration may be configurable in multiples of 2 ms (e.g., such that the beacon may set or configure the minimum block duration). The actual block duration may be defined as an integer multiple of the minimum block duration (e.g., as an absolute value or a factor that represents a multiple of the minimum block duration). For example, if the minimum block duration is 96 ms, and the actual block duration is to be set as 288 ms, then the actual block duration specified in the block duration portion may be 3 (e.g., 3×96 ms=288 ms). The beacon signal structure may include a chap per slot portion (including 4 bits for configuring the number of chap per slots), and a slot per round portion (including 4 bits for configuring the number of slots per round). The beacon signal/frame structure may include an idle round portion (including 8 bits for configuring the number of idle rounds). The beacon signal structure may include an FCS portion (including 16 or 32 bits for configuring the frame check sequence). The beacon may use the beacon signal structure for configuring the block (and rounds of the block). For example, the block or round duration may be specified based on the chap per slot and/or slots per round (e.g., 1 chap=0.3333 ms). The chap per slot value may be selected from a value of 3, 4, 6, 8, 9, 12, 24, or other values. Similarly, the slots per round may be selected from a value of 6, 8, 9, 12, 24, 32, 36, 48, 72, 96, or other values. Together, these values may define the block and/or round duration.

Referring now to FIG. 20, depicted is a diagram of an example beacon signal using the beacon signal structure of FIG. 19, according to an example implementation of the present disclosure. In this example, a UWB-based device (e.g., an initiator device) may broadcast, send, or otherwise provide a beacon signal for configuring the block in which ranging and data transmission is performed between an initiator and responder(s). In some embodiments, the device may transmit the beacon signal to initiator and/or responder devices at a certain interval, and/or prior to one or more blocks. In some embodiments, the device may transmit the beacon signal to initiator and/or responder devices responsive to the beacon modifying the beacon signal/frame (e.g., based on a delta in the configuration).

In the example shown in FIG. 20, the minimum block duration may be 24 ms, and the actual block duration set as 96 ms by the beacon. The device may generate the beacon signal including bits which set the minimum block duration as 48 ms (e.g., 24×2 ms minimum block duration), and set the block multiplier as 2 (e.g., to provide an actual block duration of 96 ms). The device may generate the beacon signal to specify 3 chaps per slot, 8 slots per round, and a number of idle rounds as any number between 0 and 12. As stated above, the duration of a chap may be 0.3333 ms. In this example, with three chaps per slot, the slots may have a duration of 1 ms (e.g., 3×0.3333 ms=1 ms). Additionally, the round may have a duration of the 8 ms (e.g., 8 slots×1 ms slot duration). The total number of rounds may be 12 (e.g., actual block duration of 96 ms/8 ms round duration=12).

Referring now to FIG. 21 and FIG. 22, depicted is another diagram of a beacon signal/frame structure and a diagram of an example beacon signal using the beacon signal structure of FIG. 21, respectively, according to example implementations of the present disclosure. The beacon signal structure shown in FIG. 21 may be similar in some aspects to the beacon signal structure shown in FIG. 19. In the beacon signal structure shown in FIG. 21, the minimum block duration may be a default or known value (for example, may be a default value of 96 ms). In this example, a beacon frame may omit, forego, or otherwise not provide any data corresponding to the minimum block duration (as the minimum block duration is a default or known value). Rather, for configuring the actual block duration, the beacon signal structure may include a portion for a block duration multiplier. For example, where the minimum block duration is fixed at 96 ms, to provide an actual block duration of 288 ms, a beacon frame may specify/provide a block duration multiplier of 3 (e.g., 3×96 ms=288 ms). In this implementation, the beacon signal structure may be more consolidated as compared to the beacon signal structure shown in FIG. 19.

Continuing the example shown in FIG. 22, the beacon frame shown in FIG. 17 may configure at least one block in which ranging and data transmission is performed between an initiator and responder(s) (which may be provided prior to a certain block or when a block configuration is to be changed, as described above). In this example, the default (or fixed, predetermined, preconfigured, set) minimum block duration may be 96 ms, and the actual block duration set as 192 ms by the beacon. The device may generate the beacon signal including bits which set the block multiplier as 2 (e.g., to provide an actual block duration of 192 ms, or 2×96 ms=192 ms). The device may generate the beacon signal to specify 3 chaps per slot, 8 slots per round, and a number of idle rounds as any number between 0 and 24. As stated above, the duration of a chap may be 0.3333 ms. Similar to the example shown in FIG. 20, with three chaps per slot, the slots may have a duration of 1 ms (e.g., 3×0.3333 ms=1 ms). Additionally, the round may have a duration of the 8 ms (e.g., 8 slots×1 ms slot duration). The total number of rounds may be 24 (e.g., actual block duration of 192 ms/8 ms round duration=24).

According to the implementations and embodiments described herein, the systems and methods of the present disclosure may provide for or otherwise incorporate data into ranging protocols, ranging rounds and/or ranging packets exchanged between devices 302, 304 in an environment 300. Similarly, the systems and methods described herein may secure the data using LDPC encoders/decoders, thereby increasing the reliability and sensitivity of the data packets exchanged between the devices 302, 304. Furthermore, the systems and methods described herein may provide a customizable/adaptable configuration of data blocks which are used for transferring, transmitting, receiving, or otherwise exchanging data between the devices 302, 304.

Figure 23:
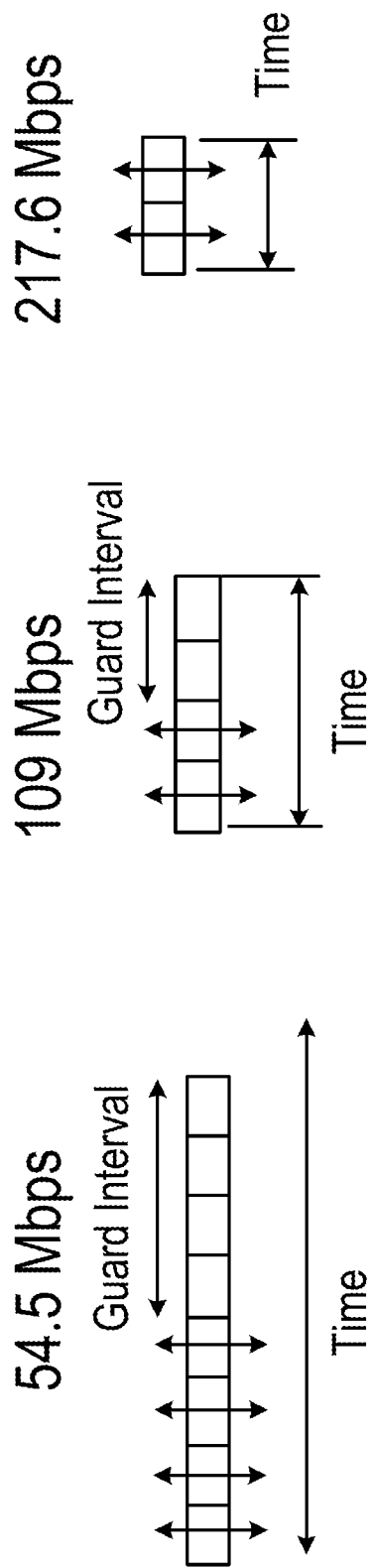
FIG. 23 is a diagram of various data frames for modulating to different data (or bit transfer) (PHY) rates, according to an example implementation of the present disclosure.

Referring now to FIG. 23, depicted is a diagram of various data frames for modulating to different data (or bit transfer) (PHY) rates. In some implementations, a data frame may include a number of signal pulses and a number of guard intervals. The signal pulses may be repeat transmissions, which provide a redundancy in the data transmission. For instance, for each data transmission, the number of signal pulses may represent a number of repeat transmissions. As such, as the number of signal pulses increase, the overall data transmission rate may decrease (since the overall number of repeat transmissions increase, resulting in less overall data throughput). For example, a data frame may include eight signal pulses and eight guard intervals, which would result in a data transmission rate of 27.25 Mbps. In the embodiments shown in FIG. 23, the data frame may be changed to result in higher data transmission rates. For example, the data frame may include four signal pulses and four guard intervals, resulting in a data transmission rate of 54.5 Mbps. The data frame may include two signal pulses and two guard intervals, resulting in a data transmission rate of 109 Mbps. The data frame may include two signal pulses with no guard intervals, resulting in a data transmission rate of 217.6 Mbps.

In some embodiments, by providing fewer signal pulses and guard intervals, the systems and methods described herein may provide an (transmission) energy/power boost to the signal pulses. For example, since power measurements are done over a 1 ms time window in both FCC and ETSI, the systems and methods described herein may increase a power of the signal pulses, thereby increasing the signal-to-noise ratio (SNR). For example, when 1500 bytes of data are used using 27 Mbps, the overall transmission time may be approximately 500 us (including preamble of 52.5 us). Accordingly, the systems and methods described herein may increase the energy of packets by 3 dB to increase the SNR. In such instances, the sensitivity of 27 Mbps may be the same as that of 6.8 Mbps. The systems and methods described herein may increase power (also referred to herein as an energy boost) of transmissions over 100 microseconds such that a signal transmitted over 100 microseconds results in the same amount of power as a signal over a one millisecond continuous transmission. Continuing the example described above with reference to FIG. 23, by modulating data frames for providing different data rates, the systems and methods described herein may increase the power on a per-packet basis (e.g., such that the per-packet power or energy increases as the packet size decreases). Table below expands on this for the case of 4095 bytes and shows that the higher PHY rates may be obtained at similar sensitivities (within 3.2 dB) as that of 6.8 Mbps. For example, by providing an energy boost, the 218 Mbps rate may provide an optimized range along with a reduction in power consumption, at the expense of possibly higher complexity at the receiver. An increase in net throughput may be achieved by hopping across multiple channels. In that case, the net throughput would be multiplied by the number of hops achieved in a 1 ms time period.

TABLE 1

| PHY rate | Physical Layer Protocol Data Unit (PPDU) duration for 4095 bytes (assuming suboptimal 52.5 us preamble) | Net Throughput (Mbps) for this example of 4095 bytes in 1 ms duration [no frequency hopping] | Energy boost (dB) | SNR delta over 6.8 Mbps (without/with energy boost) |
|---|---|---|---|---|
| 54.5 | 654 | 32.76 | 1.8 | 5/3.2 |
| 109 | 353 | 32.76 | 4.5 | 7.2/2.7 |
| 218 | 203 | 32.76 | 6.9 | 7.5/0.6 |
| 249.6 | 184 | 32.76 | 7.3 | 9.4/2.1 |

Figure 24:
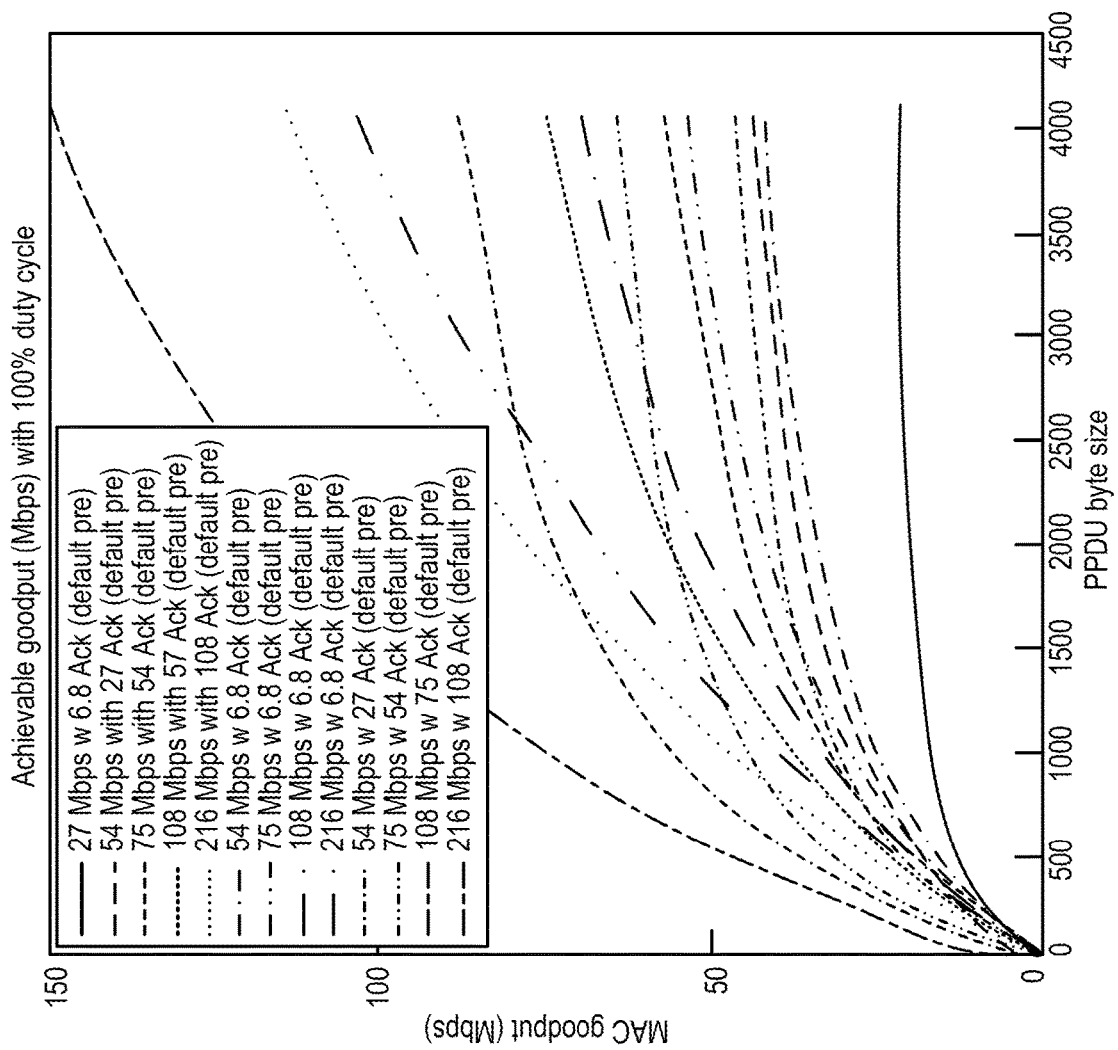
FIG. 24 is a diagram showing a data goodput, according to an example implementation of the present disclosure.

Referring now to FIG. 24, depicted is a diagram showing a data goodput. As shown in FIG. 24, the data goodput may change based on an acknowledgement (ACK). In some implementations, an ACK may be an acknowledgement of data which is received correctly. The ACK may be sent at a very low rate to ensure robustness of the ACK. However, due to the weight that 6.8 megabits per second is constructed, an ACK may be sent over 200-300 microseconds, simply to send one bit of information. According to the implementations and embodiments described herein, assuming a system is operating on 260 Mbps, the systems and methods described herein may use a 108 megabits per second transmission for the ACK. Accordingly, by using a higher data rate for an ACK, the systems and methods described herein may provide for an overall higher goodput in comparison to other data rates for ACKs. For example, assuming a packet is sent at a high rate (e.g., 260 Mbps), and an ACK is sent at a lower data rate, the overall goodput may be lower, because the amount of time for the data to be sent and acknowledged takes a longer duration. However, where a packet is sent at the higher rate and the ACK is sent at a higher data rate, the overall goodput may be higher because the amount of time for the data to be sent and acknowledged takes a shorter duration (since ACK occurs faster overall at the higher data rate).

Figure 25:
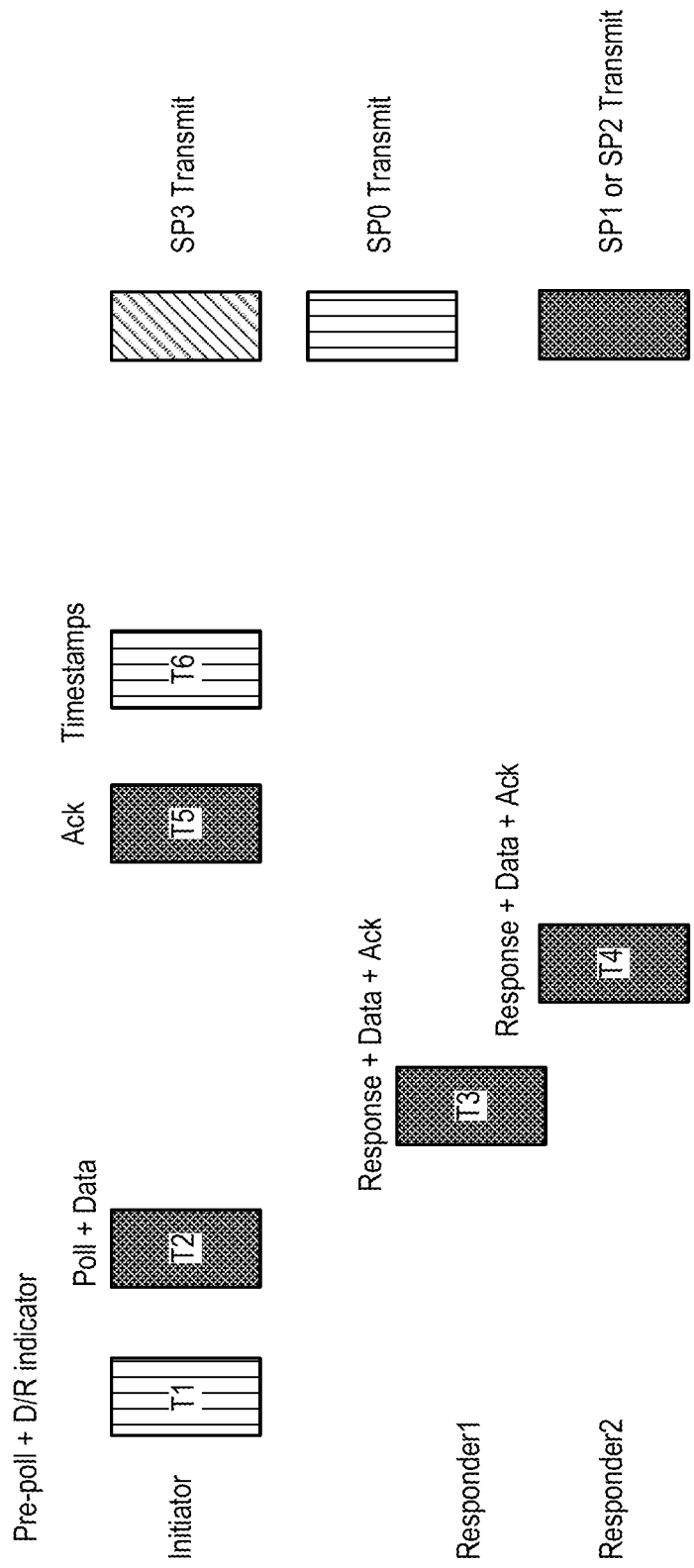
FIG. 25 is a diagram showing incorporation of data and acknowledgements into frames sent between an initiator and responder(s), according to an example implementation of the present disclosure.

Referring now to FIG. 25 in conjunction with FIG. 15, in some embodiments, the systems and methods described herein may incorporate data and acknowledgements into frames sent between the initiator and responder. For example, following the pre-poll at T1, the initiator may send a poll including data at T2. The first responder may respond with a response to the poll along with data from the first responder and acknowledgement of the T2 data (e.g., at T3). Similarly, the second responder may respond with a response to the poll along with data from the second responder and acknowledgement of the T2 data (e.g., at T4). The initiator may transmit an ACK to the first and second responders at T5, followed with timestamps at T6. Such implementations and embodiments can provide for data transmission within frames sent between the initiator and responder(s). The systems and methods described herein may incorporate data into the polls/responses by changing the packets from SP0/SP3 packets to either SP1 or SP2 transmit packets, which allow for data to be incorporated therein.

Figure 26:
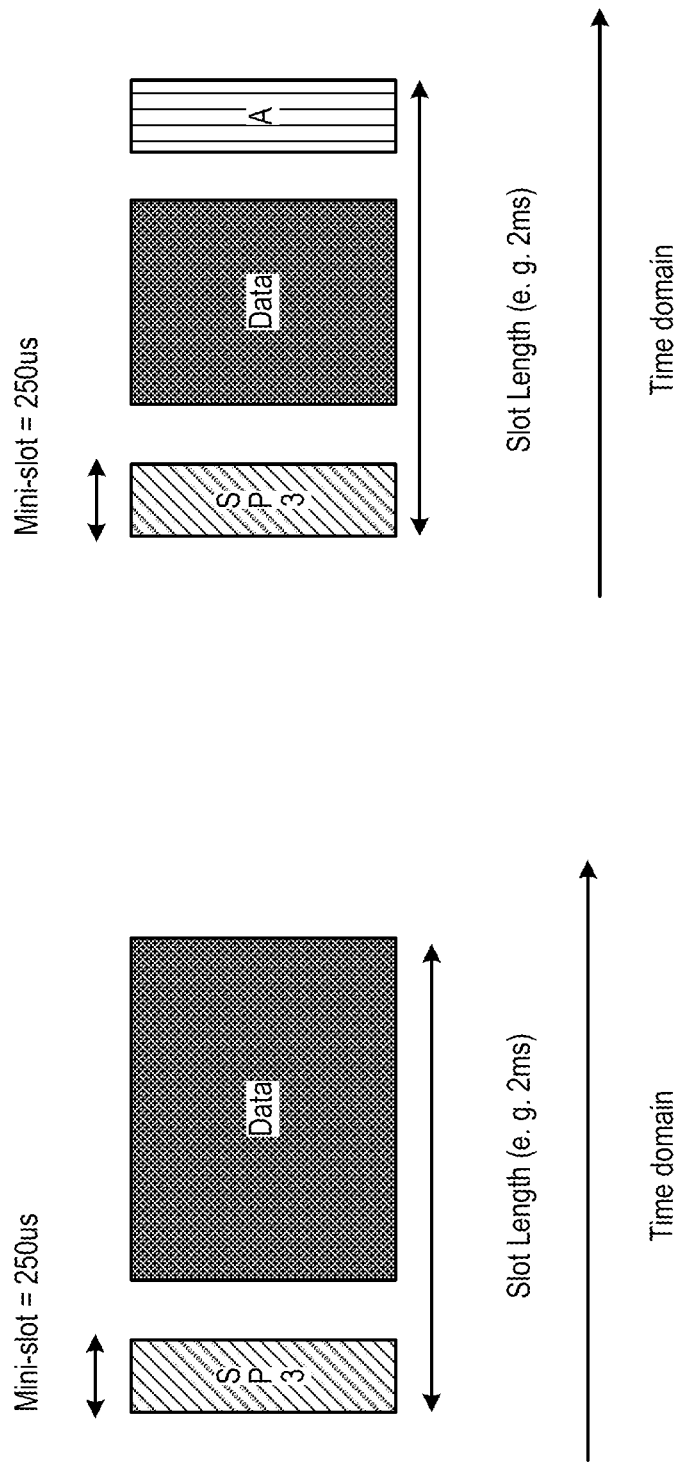
FIG. 26 is a diagram in which the initiator may provide for delayed ACKs of data from a responder, according to an example implementation of the present disclosure.

Referring now to FIG. 26, depicted is a diagram in which the initiator may provide for delayed ACKs of data from a responder. As shown in FIG. 26, the initiator may provide for an ACK at T1 (referred to as a delayed ACK). The delayed ACK may be an acknowledgement of a data from a previous range between the initiator and responder. In this example, the initiator may incorporate both a delayed ACK and data within the T1 frame, which is sent to the first and second responder. The first and second responders may respond as described above. Also in this example, the initiator may transmit another ACK (e.g., of the data sent by the responders at T3 and T4) at T6 with the timestamps.

Figure 27:
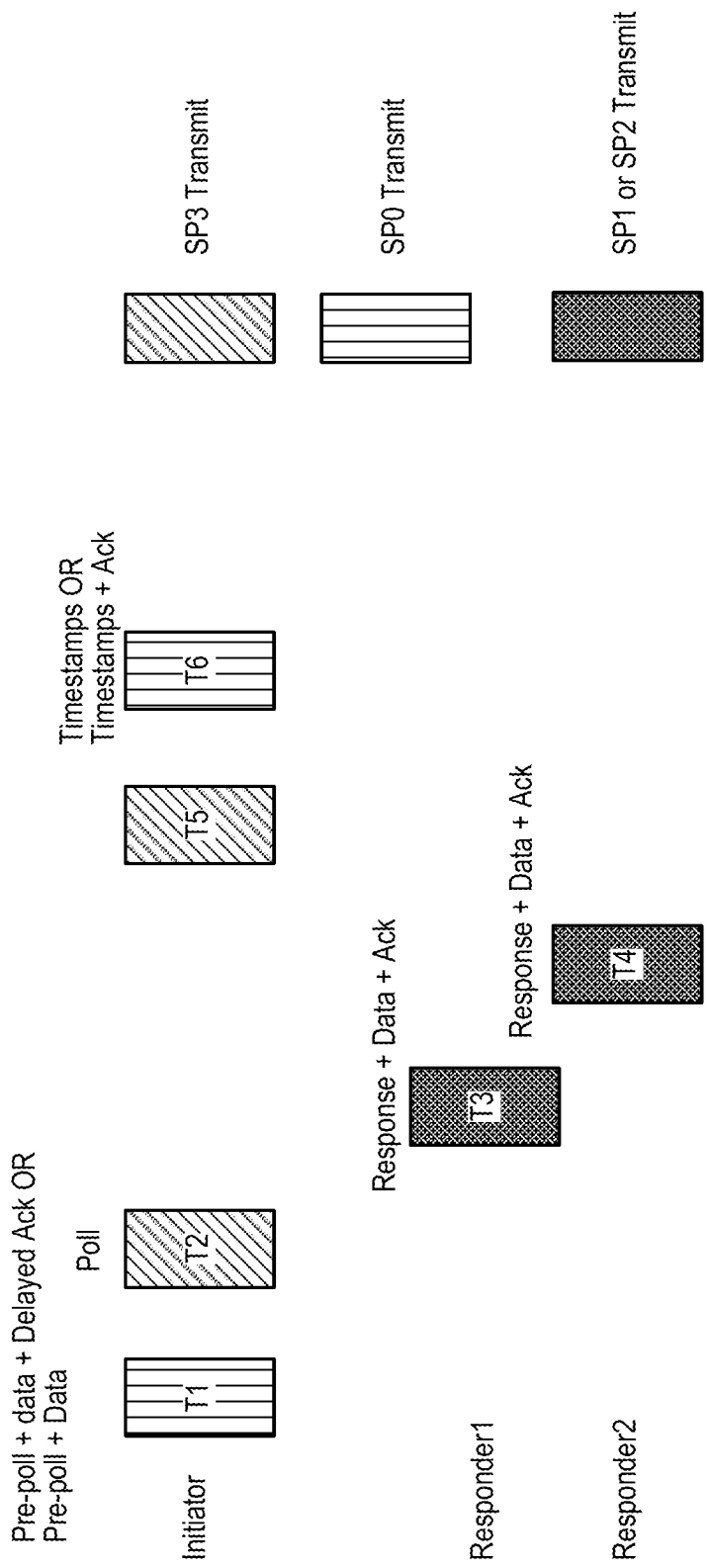
FIG. 27 is a diagram showing a slot in which data and acknowledgements may be transmitted within the slot, according to an example implementation of the present disclosure.

Referring now to FIG. 27, depicted is a diagram showing a slot in which data and acknowledgements may be transmitted within the slot. For example, a first slot may include an SP3 frame accompanied with data. The first slot may be sent by the initiator (described above with reference to FIG. 25). A second slot may also include an SP3 frame, data, and an acknowledgement to the first slot. The second slot may be sent by one of the responders (e.g., described above with reference to FIG. 25). Such implementations and embodiments can provide for shared data between the initiator and responders within slots of frames sent between the devices.

Figure 28:
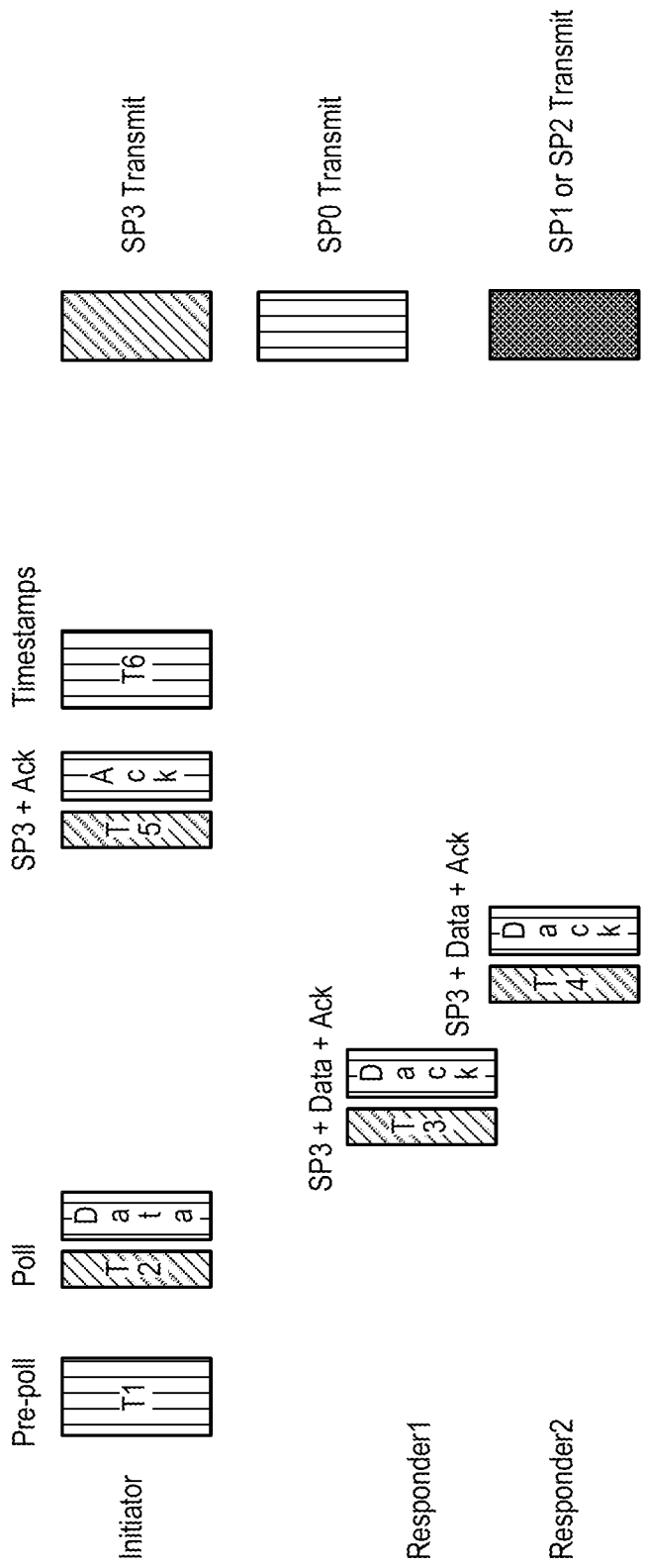
FIG. 28 is a diagram in which the initiators and responders may include data packets within slots, according to an example implementation of the present disclosure.

Referring now to FIG. 28, depicted is a diagram in which the initiators and responders may include data packets within slots. For example, the systems and methods described herein may incorporate the slots shown in FIG. 27 into the frames shown in FIG. 25-26. In this example, in a slot in which the initiator sends the poll at T2, the slot may include the poll and data. The responders may send a response at T3 and T4, which is accompanied with a "dack" or data and an acknowledgement of the data sent at T2. Rather than incorporating the data into a single frame, the systems and methods described herein may generate additional frames which include the data and acknowledgements, and the response. Additionally, the initiator may be configured to send a group acknowledgement to each of the responders, where one bit may be allocated to each responder. Such implementations and embodiments may provide data flow sent between initiators and responders without effecting any original ranging flows between devices.

Systems and Methods of Segment Splitting Across Frames

Figure 29:
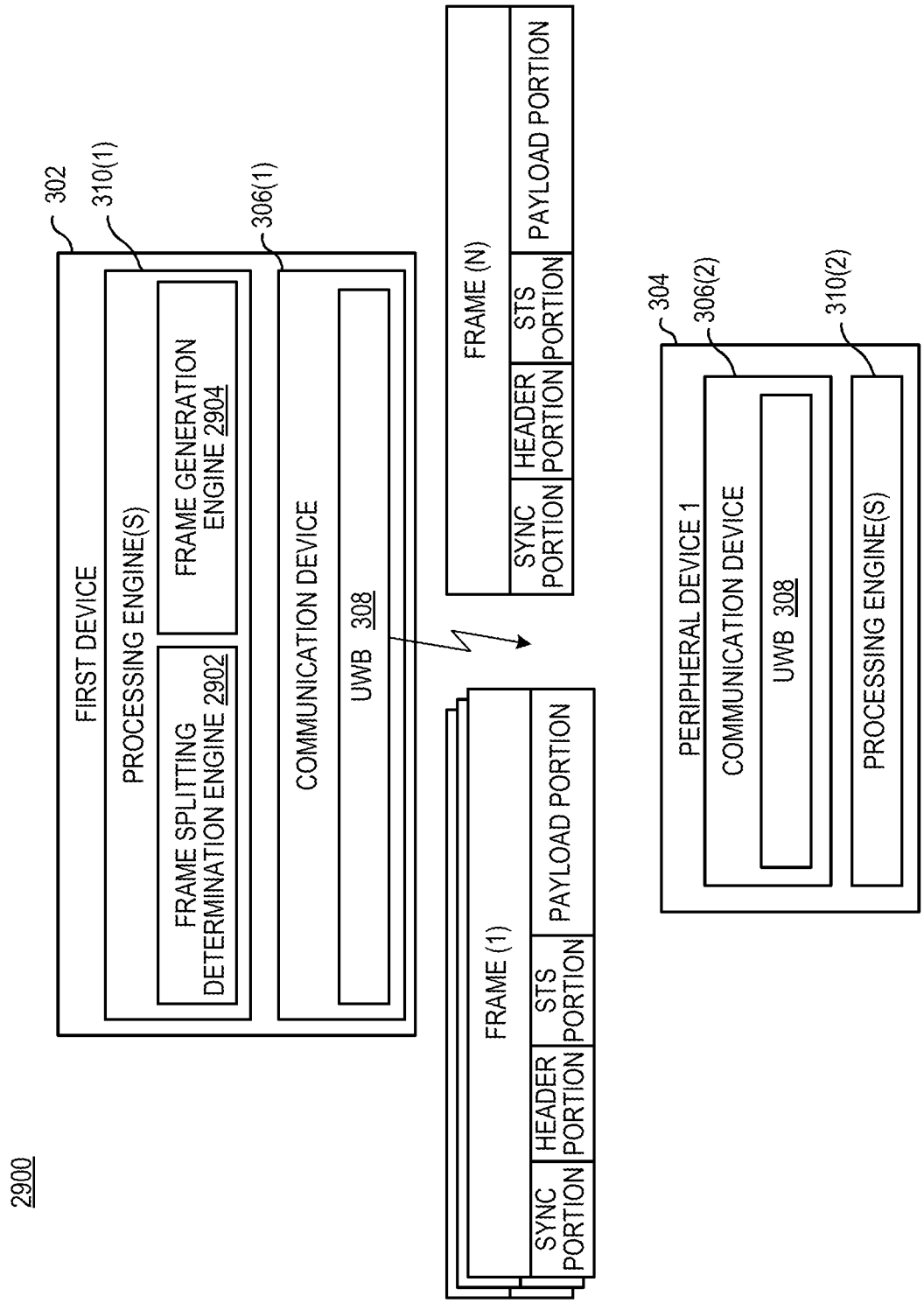
FIG. 29 is a diagram of a system for timing synchronization for UWB, according to an example implementation of the present disclosure.
Figure 30A:
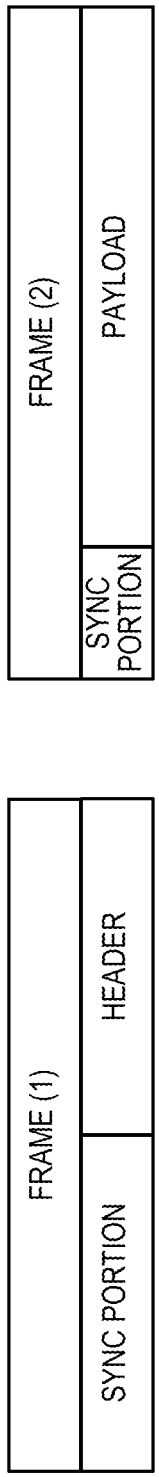
FIG. 30A-D are diagrams of a first type of frames which may be generated by one or more of the devices in the system of FIG. 29, according to an example implementation of the present disclosure.
Figure 30B:
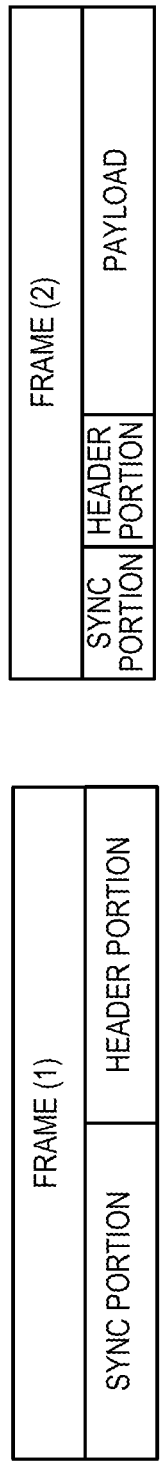
Figure 30C:
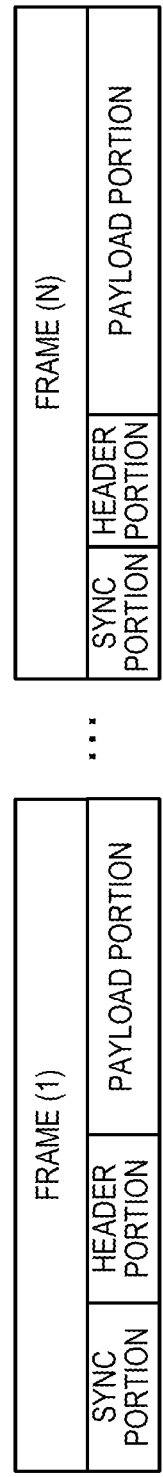
Figure 30D:
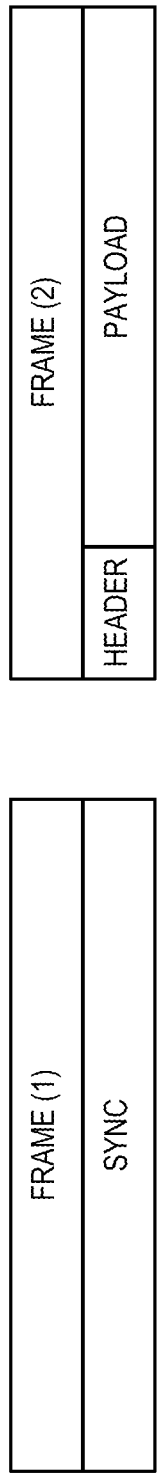
Figure 31A:
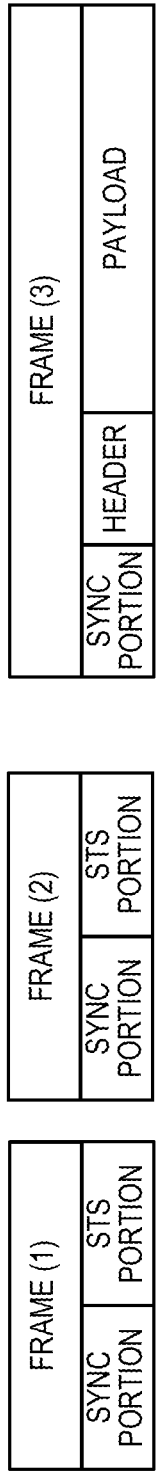
FIG. 31A-C are diagrams of a second type of frames which may be generated by one or more of the devices in the system of FIG. 29, according to an example implementation of the present disclosure.
Figure 31B:
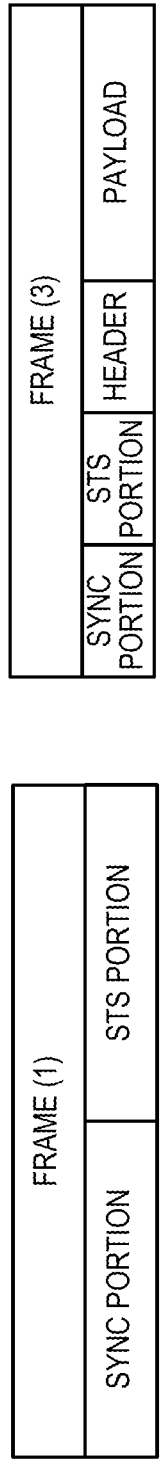
Figure 31C:
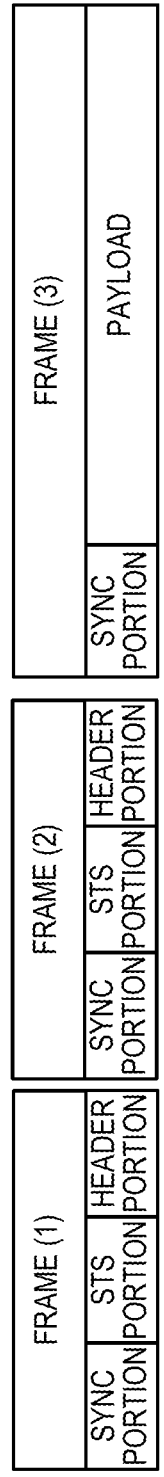
Figure 32A:
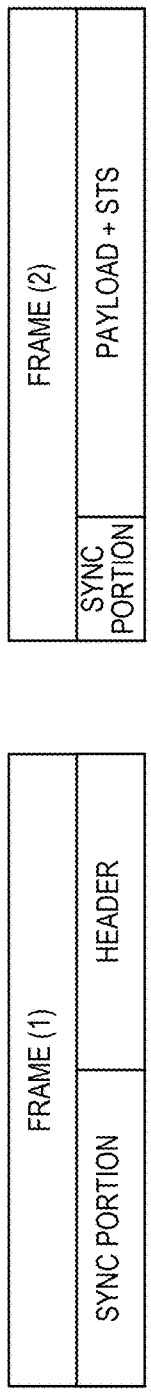
FIG. 32A-E are diagrams of a third type of frames which may be generated by one or more of the devices in the system of FIG. 29, according to an example implementation of the present disclosure.
Figure 32B:
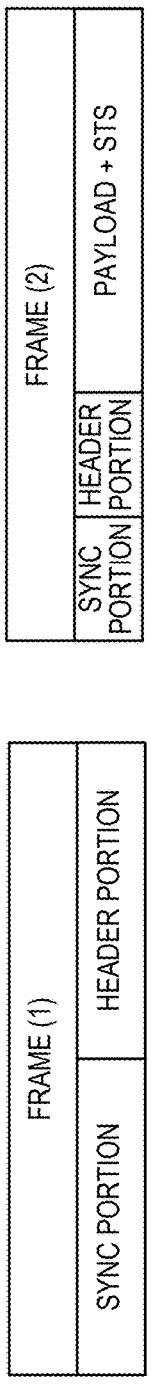
Figure 32C:
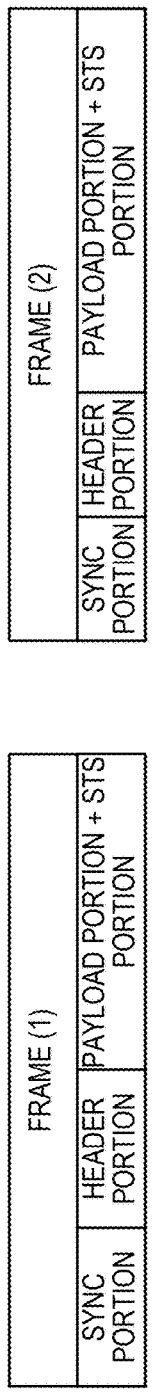
Figures 31D, 32D:
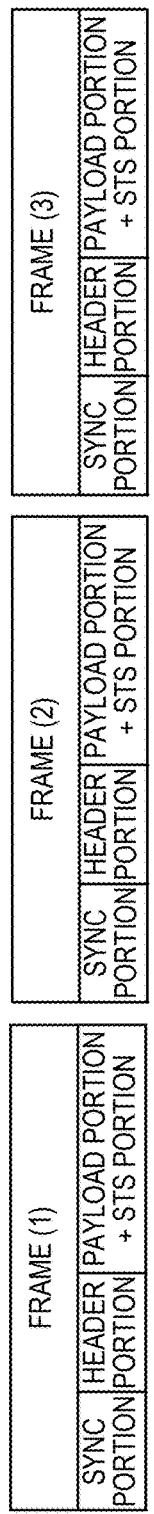
Figure 32E:
Figure 33A:
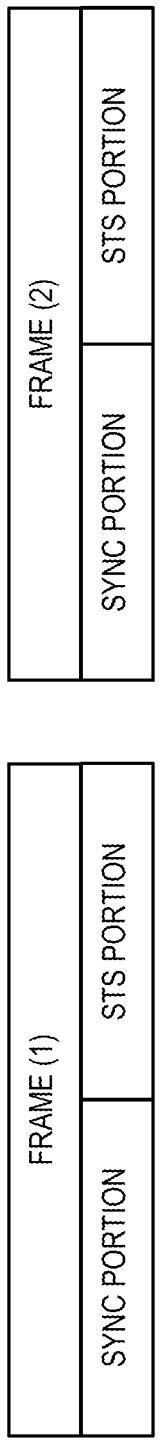
FIG. 33A-D are diagrams of a fourth type of frames which may be generated by one or more of the devices in the system of FIG. 29, according to an example implementation of the present disclosure.
Figure 33B:
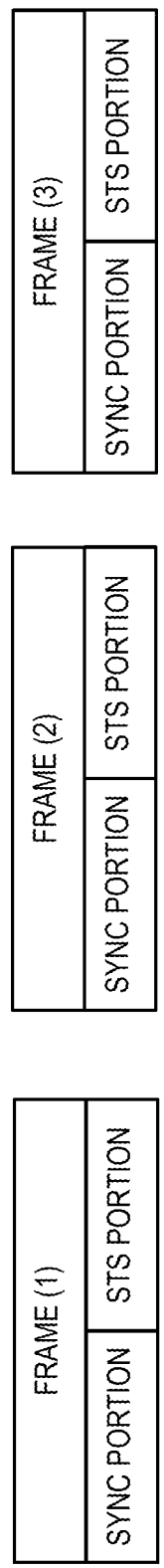
Figure 33C:
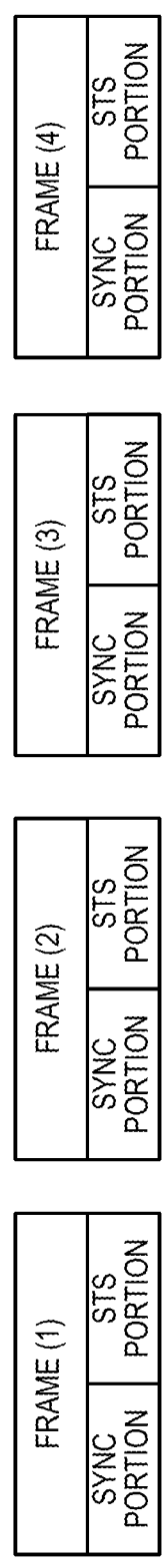
Figure 33D:
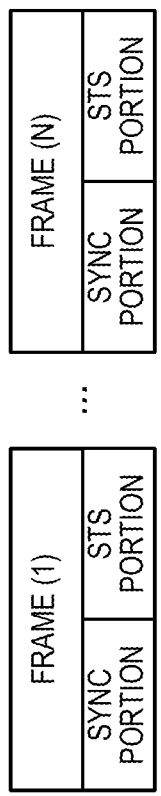

Referring now to FIG. 29, depicted is a system 2900 of segment splitting across frames for UWB devices, according to an example implementation of the present disclosure. The system 2900 may include a first device 302 and a peripheral device 304 similar to the devices 302, 304 shown in FIG. 3 and described above. As described in greater detail below, a device (such as the first device 302 and or peripheral device 304) may be configured to (determine to) split a scrambled timestamp sequence (STS) into at least a first portion and a second portion of the STS, for transmission to another device (such as the other device of the first device 302 or peripheral device 304). The device may be configured to transmit a first frame including the first portion of the STS to the other device, and may transmit a second frame including the second portion of the STS to the other device.

The first device 302 and peripheral device 304 may be configured to exchange packets, transmissions, and/or data for performing ranging (e.g., as described above with reference to FIG. 3). Additionally, the first device 302 and peripheral device 304 may be configured to transmit, send, or otherwise incorporate data into ranging packets/transmissions/rounds as described above with reference to FIG. 4-FIG. 28. For example, where the first device 302 is transmitting data to the peripheral device 304, the first device 302 may be similar to the initiator or initiator device referred to above with reference to FIG. 4-FIG. 28. Similarly, the peripheral device 304 may be similar to the responder or responder device referred to above with reference to FIG. 4-FIG. 28. Additionally, where the peripheral device 304 is transmitting data to the first device 302, the peripheral device 304 may perform similar functions to those performed by the initiator/initiator device and the first device 302 may perform similar functions to those performed by the responder device. In this regard, the first and peripheral devices 302, 304 may be configured to perform packet/frame/transmission generation, transmission, receipt, and/or processing similar to what is described above with reference to FIG. 4-FIG. 28.

One or more of the devices 302, 304 may include various processing engines 310. The processing engines 310 may be or include any device, component, machine, or other combination of hardware and software designed or implemented to control the devices 302, 304 based on UWB signals transmitted and/or received by the respective UWB devices 308. The processing engine(s) 310 may include a frame splitting determination engine 2902 and a frame generation engine 2904. While shown as being components of the first device 302, it is noted that the peripheral device 304 may include similar processing engines 310.

As briefly described above with reference to FIG. 4-FIG. 28, a given frame having a particular frame type may have a number of sequences, portions, or segments (generally referred to herein as "segments") of the frame which can include different types of information pertaining to the frame, channel on which the frame is sent, and/or link between the devices 302, 304. For example, a packet or frame may have different configurations or information depending on the frame type. As one example, a frame having a scrambled time sequence (STS) configuration zero may have a format of a synchronization sequence (SYNC), followed by a start frame delimiter (SFD), a packet header or header, and a payload. As another example, a frame having a STS configuration one may have a format of a SYNC, followed by an SFD, STS, header, and payload. As yet another example, a frame having an STS configuration two may have a format of a SYNC, followed by an SFD, header, payload, and STS. As still another example, a frame having an STS configuration three may have a format of a SYNC followed by an SFD and STS. In each of these examples, a reference marker may follow the SFD. For a given frame, the format may include sequences or segments which together define the frame format, where the segments may include the SYNC, SFD, STS, header, and/or payload, depending on the frame configuration.

The first device 302 may include a frame splitting determination engine 2902. The frame splitting determination engine 2902 may be or include any device, component, element, or hardware configured to determine to split one or more segments of a frame into portions of the segment. For example, the frame splitting determination engine 2902 may be configured to determine to split the SYNC into one or more portions of a SYNC, the STS into one or more portions of the STS, the header into one or more portions of the header, the payload into one or more portions of the payload, etc. Examples of such portions are further described with reference to FIG. 30A-FIG. 33D.

In some embodiments, the frame splitting determination engine 2902 may be configured to determine to split a segment into one or more portions based on a size of a payload. For example, the frame splitting determination engine 2902 may be configured to determine to split a given segment into one or more portions responsive to a size of a payload for transmission to the peripheral device 304. The frame splitting determination engine 2902 may be configured to receive a payload from a data stack or pipeline of the first device 302, for incorporation into one or more frames for transmission to the peripheral device 304. The data stack or pipeline may be, for example, a stream or series of data of an application which is executing on the first device 302. As one example, where the first device 302 is transmitting graphics data to the peripheral device 304, the data stack or pipeline may be or include changes in the graphics over time, updates to the graphics, new or updated video frames, and so forth. As another example, where the first device 302 is transmitting user inputs from the first device 302 to the peripheral device 304, the data stack or pipeline may be or include commands, instructions, or feedback generated by the first device 302 based on the user inputs to the first device 302.

As described above with reference to FIG. 4-FIG. 28, the first device 302 may be configured to transmit frames to the peripheral device 304 according to or based on a slot schedule. The slot schedule may include various time windows (e.g., mini-slots or sub-slots) or slots in which the first device 302 is scheduled to transmit frames to the peripheral device 304. The mini-slots or sub-slots may each be configured/defined to have any duration within a given slot, such as 16 μs, 20 μs, 32 μs, 40 μs, 50 μs, 60 μs, 63 μs, 64 μs, 73 μs, 80 μs, 100 μs, 125 μs, 128 μs, 250 μs, 256 μs, or any other duration. The frame splitting determination engine 2902 may be configured to compare a payload from the data stack or pipeline to a threshold, to determine whether to split a segment of a frame into one or more portions. The threshold may be or include a threshold duration in which to transmit the payload within a given slot. The frame splitting determination engine 2902 may be configured to compute a duration for transmitting the payload. For example, the frame splitting determination engine 2902 may be configured to compute the duration based on a size of the payload (e.g., a number of bits or bytes to be included in the payload) and/or a bit transfer rate for a given frame. The bit transfer rate may be, for instance, a goodput, such as one of the goodputs shown in FIG. 24. The frame splitting determination engine 2902 may be configured to compare the computed duration for the payload to the threshold duration. The frame splitting determination engine 2902 may be configured to determine to split the segment into one or more portions responsive to the computed duration satisfying the threshold. For example, the frame splitting determination engine 2902 may be configured to determine to split the segment into one or more portions responsive to the computed duration exceeding the threshold duration.

In some embodiments, the frame splitting determination engine 2902 may be configured to determine to split a frame (e.g., segments of a frame) into multiple portions. For instance, the frame splitting determination engine 2902 may be configured to determine to split a frame into a plurality of frames based on comparing the computed duration to the threshold duration. The frame splitting determination engine 2902 may be configured to determine a number of frames in which to split the segments based on the computed duration. For example, the frame splitting determination engine 2902 may be configured to determine the number of frames based on or according to a factor in which the computed duration satisfies the threshold. As an example, where the computed duration is greater than the threshold duration by a multiple of two (e.g., the computed duration is >2 times the threshold duration), the frame splitting determination engine 2902 may be configured to determine to split the frame into three frames. As such, the frame splitting determination engine 2902 may be configured to determine to split a frame into any number of frames according to the size of the payload.

In some embodiments, the frame splitting determination engine 2902 may be configured to determine to split a segment into one or more portions based on one or more settings of the device 302, 304. For example, the frame splitting determination engine 2902 may be configured to determine, receive, or otherwise identify one or more settings of the devices 302, 304. The settings may be default settings of the devices 302, 304, user selected settings of the devices 302, 304, settings corresponding to an application executing on the devices 302, 304, and so forth. The settings may be selected, determined, or otherwise provided to split a segment into one or more portions to, for example, conserve or increase bandwidth (e.g., by providing smaller frame sizes), to increase throughput and successful delivery of packets or frames, etc.

In some embodiments, the frame splitting determination engine 2902 may be configured to determine to split a segment into one or more portions based on or according to a metric (e.g., a metric indicative of quality) corresponding to the link or channel between the first device 302 and peripheral device 304. The frame splitting determination engine 2902 may be configured to determine the metric(s) corresponding to the link as packets or frames are sent between the device(s) 302, 304. For example, the frame splitting determination engine 2902 may be configured to measure, quantify, detect, determine, or otherwise identify metric(s) or a quality corresponding to the link. The metrics may be or include, for instance, throughput, uplink speed, downlink speed, round trip time (RTT), packets or frames dropped, etc. The frame splitting determination engine 2902 may be configured to compare the metric(s) to one or more thresholds. The frame splitting determination engine 2902 may be configured to determine to split a segment across a plurality of frames based on the metric(s) satisfying a threshold criteria (e.g., the throughput being less than or equal to a threshold throughput, the uplink or download speed being less than or equal to a threshold speed, the RTT being greater than or equal to a threshold RTT, the number of packets or frames dropped being greater than or equal to a threshold number, and so forth).

The frame splitting determination engine 2902 may be configured to determine a segment splitting scheme responsive to determining to split a packet or frame, or segments of a packet or frame, into portions. The segment splitting scheme may be or include a frame format, including the respective portions of segment(s) which are to be split across two or more frames. The frame splitting scheme may be or include a plurality of frame formats for different types of frames. For example, the frame splitting scheme may include a first frame format for STS configuration zero frames, a second frame format for STS configuration one frames, a third frame format for STS configuration two frames, and/or a fourth frame format for STS configuration three frames.

Referring now to FIG. 30A-FIG. 33D in connection with FIG. 29, the frame splitting determination engine 2902 may be configured to select a frame format for one or more types of frames. Specifically, FIG. 30A-FIG. 30D show various examples of frame formats for STS configuration zero frames, FIG. 31A-FIG. 31C show various examples of frame formats for STS configuration one frames, FIG. 32A-FIG. 32E show various examples of frame formats for STS configuration two frames, and FIG. 33A-FIG. 33D show various examples of frame formats for STS configuration three frames. While these example frame formats are shown, it is noted that further iterations/variations of frame formats can be selected by the frame splitting determination engine 2902. For example, while a segment of a frame may be shown as being split across two frames, the segment may be split across any number of frames (such as two frames, four frames, eight frames, 16 frames, etc.). Accordingly, the present disclosure is not limited to the specific example frame formats shown in FIG. 30A-FIG. 33D, and contemplates further iterations/variations of frame formats for different types of frames.

As shown in the various example frame formats, the frame splitting determination engine 2902 may be configured to split various segments of a frame into a plurality of portions. For instance, the frame splitting determination engine 2902 may be configured to determine to split the SYNC segment into a plurality of SYNC portions, the header segment into a plurality of header portions, the STS into a plurality of STS portions, the payload into a plurality of payload portions, and so forth.

In some embodiments, the frame splitting determination engine 2902 may be configured to determine to split a segment into equal sized portions. For example, where the frame splitting determination engine 2902 determines to split a segment across two frames, the frame splitting determination engine 2902 may be configured to determine to split the segment into a first segment portion and a second segment portion, where the first segment portion is half of the initial segment and the second segment portion is the other half of the initial segment. In other words, the portions may be half segments. Additionally, where the frame splitting determination engine 2902 determines to split a segment across three, four, or any N number of frames, the frame splitting determination engine 2902 may be configured to split the segment into (segment-length/N) sized portions.

In some embodiments, the frame splitting determination engine 2902 may be configured to determine to split a segment into different sized portions. For example, where the frame splitting determination engine 2902 determines to split a segment across two frames, the frame splitting determination engine 2902 may be configured to determine to split the segment into a first segment portion and a second segment portion, where the first segment portion is a larger/longer portion (or smaller/shorter portion) of the initial segment than the second segment portion. For instance, the first portion may be a partial portion of the segment, and the second portion may be a reduced portion of the segment (e.g., reduced by the partial portion). It is noted that, in each of these embodiments, at least some segments which are split may be split in a manner in which the portions are equal to the original/unsplit/initial segment if the original/unsplit/initial segment was included in a single packet or frame.

In some embodiments, the frame splitting determination engine 2902 may be configured to transmit, send, or otherwise provide a segment splitting scheme to the peripheral device 304. The frame splitting determination engine 2902 may be configured to transmit, send, or otherwise provide the segment splitting scheme to the peripheral device 304 prior to splitting a frame into a plurality of frames. For example, the frame splitting determination engine 2902 may be configured to provide the segment splitting scheme to the peripheral device 304 as part of negotiation of the channel/link/connection between the devices 302, 304, in a beacon transmission, etc. In some embodiments, the frame splitting determination engine 2902 may be configured to provide the segment splitting scheme to the peripheral device 304 on the UWB channel or link between the devices 302, 304 in which the frames are sent to the peripheral device 304. In some embodiments, the frame splitting determination engine 2902 may be configured to provide the segment splitting scheme to the peripheral device 304 on a non-UWB channel or link, such as on a BLUETOOTH channel or link, a Wi-Fi channel or link, or other out-of-band (OOB) channel or link.

Referring back to FIG. 29, the frame generation engine 2904 may be configured to produce, create, establish, provide, or otherwise generate a plurality of frames for transmission to the peripheral device 304. In some embodiments, the frame generation engine 2904 may be configured to generate the plurality of frames responsive to or based on the frame splitting determination engine 2902 determining to split one or more segments of a frame across a plurality of frames. The frame generation engine 2904 may be configured to generate the plurality of frames according to the frame splitting scheme determined by the frame splitting determination engine 2902. The frame generation engine 2904 may be configured to generate a first frame and at least a second frame. The frame generation engine 2904 may be configured to generate the first frame to include a first portion of the segment and can generate the second frame to include the second portion of the segment. As noted above, the segment which is split across the first and second frames may be or include the STS, the header, the SYNC, the payload, etc. The frame generation engine 2904 may be configured to generate the frames according to the selected frame format for the frame type from the segment splitting scheme. The frame generation engine 2904 may be configured to generate the frames by dividing the segment across the plurality of frames, according to the segment splitting scheme. For instance, the frame generation engine 2904 may be configured to divide the SYNC, the STS, the header, and/or the payload into the respective portions for including or incorporating into the respective frames.

The first device 302 may be configured to send, communicate, transfer, or otherwise transmit the plurality of frames to the peripheral device 304. In some embodiments, the first device 302 may be configured to transmit the first and additional frames (e.g., at least the second frame) to the peripheral device 304 on the UWB channel or link. The first device 302 may be configured to transmit the frames in respective time windows, according to a slot schedule for the UWB channel or link. In some embodiments, the first device 302 may be configured to transmit the first frame in a first time window and the second frame in a second time window. The first and second time windows may be mini-slots, or subsets/portions/windows/sub-slots within a common or single slot. In some embodiments, the first and second time windows may be first and second slots (e.g., separate slots) of the slot schedule.

As described above with reference to FIG. 4-FIG. 28, the peripheral device 304 may be configured to receive the frames from the first device 302. The peripheral device 304 may be configured to generate acknowledgement message(s) of the frames for transmission to the first device 302. As described above with reference to FIG. 18 and FIG. 26, the peripheral device 304 may be configured to incorporate payload data and an acknowledgement into the acknowledgement message. The peripheral device 304 may be configured to generate the acknowledgement message for each/some/all of the frames received from the first device 302. For instance, the peripheral device 304 may be configured to generate a first acknowledgement message for the first frame, and a second acknowledgement message for the second frame. In some embodiments, the peripheral device 304 may be configured to generate the acknowledgement message for a plurality of frames (e.g., a bulk or block acknowledgement message). In other words, the peripheral device 304 may be configured to generate an acknowledgement message including an acknowledgement for both the first and second frames.

Figure 34:
FIG. 34 is a diagram of a flowchart showing a method of timing synchronization, according to an example implementation of the present disclosure.

Referring now to FIG. 34, depicted is a flowchart showing a method 3400 of segment splitting across frames, according to an example implementation of the present disclosure. The method 3400 may be performed by the devices, components, and/or hardware described above with reference to FIG. 1-FIG. 33D and FIG. 35. As a brief overview, at step 3402, a first ultra-wideband (UWB) device may determine to split a segment of a frame into at least a first portion and a second portion of the segment. At step 3404, the first UWB device may transmit a first frame including the first portion of the segment. At step 3406, the first UWB device may transmit a second frame including the second portion of the segment.

At step 3402, a first ultra-wideband (UWB) device may determine to split a segment of a frame into at least a first portion and a second portion of the segment. In some embodiments, the first device may determine to split a segment of a frame into at least a first portion and a second portion of the segment, for transmission to a second UWB device. The segment may be, for example, a scrambled time sequence (STS) of the frame. While the method 3400 is described with respect to splitting the STS, it should be understood that the method 3400 may be applicable to splitting any sequence or portion/content of a frame into a plurality of portions. For example, the method 3400 may be applicable to splitting a header into a first header portion and at least a second header portion, a payload into a first payload portion and a second payload portion, a SYNC signal or sequence into a first SYNC portion and a second SYNC portion, etc.

In some embodiments, the first UWB device may determine to split the segment into at least the first and second portions of the sequence responsive to a size of a payload for transmission to the second UWB device. The first UWB device may determine or identify the payload size for transmissions sent to the second UWB device. The first UWB device may determine the payload size from a data pipeline or stack, in which data is to be communicated from the first device to the second UWB device. The data pipeline or stack may be or include a data pipeline of an application executing on the first and second UWB devices, a minimum throughput or transmission schedule, etc. The first UWB device may determine a duration corresponding to a time window in which the first UWB device is scheduled to transmit a frame to the second UWB device. The time window may be, for example, slots within a slot schedule set, negotiated, or otherwise defined for the first UWB device to transmit frame(s) to the second UWB device. The time window may be or include a sub-slot or mini-slot within a given slot. The first UWB device may determine a duration for transmitting the payload to the second UWB device based on the size (e.g., in bits) of the payload and a data/bit transfer rate for the channel or connection between the first UWB device. The first UWB device may determine to split the segment into at least the first portion and the second portion responsive to the duration for transmitting the payload satisfying a threshold criteria (e.g., the duration to transmit the payload being greater than or equal to the time window). In some embodiments, the first UWB device may determine a number of frames to generate based on a comparison of the duration for transmitting the payload, to the time window. For example, the first UWB device may determine the number of frames as equal to the largest whole integer (e.g., rounded up) of the duration for transmitting the payload divided by the time window.

In some embodiments, the first UWB device may determine to split the segment into at least the first portion and the second portion responsive to a metric corresponding to a connection between the first UWB device and the second UWB device. The first UWB device may determine one or more metrics corresponding to the connection between the first UWB device and the second UWB device. The metrics may include, for example, throughput, uplink speed, downlink speed, round trip time (RTT), dropped packets or frames, etc. The first UWB device may determine the metrics in real-time (e.g., based on frame transmissions and acknowledgement messages). The first UWB device may compare the metrics for the connection to one or more threshold metrics. The first UWB device may determine to split the segment into at least the first portion and the second portion responsive to the metrics for the connection satisfying a threshold criteria (e.g., responsive to the throughput being less than or equal to a threshold throughput, the uplink or downlink speed being less than or equal to a threshold speed, the RTT being greater than or equal to a threshold RTT, the number of dropped packets or frames being greater than or equal to a threshold number, etc.).

The first UWB device may generate the first frame and the second frame. The first UWB device may generate the first frame and the second frame responsive to determining to split the segment into at least the first portion and the second portion. The first UWB device may generate the first frame to include the first portion of the segment, and may generate the second frame to include the second portion of the segment. The first UWB device may generate the first and second frames to have a frame format similar to those frames shown in FIG. 30A-FIG. 33D, depending on a frame type for the frame. The first UWB device may generate the first frame and the second frame by splitting the segment into the respective portions. In some embodiments, the portions may be equal sized portions across a plurality of frames. For example, the first UWB device may split the payload into a first portion of the payload and a second portion of the payload, where the first portion has the same number of bits as the second portion. In some embodiments, the portions may be different sized portions across the plurality of frames. For example, the first UWB device may split the payload into a first portion of the payload and a second portion of the payload, where the first portion is a greater/smaller size (e.g., in bits) than the second portion.

In some embodiments, the first UWB device may split multiple segments of the frame into several respective portions. For instance, the first UWB device may split both the STS and the header into a first STS portion and first header portion for including in the first frame, and a second STS portion and a second header portion for including in the second frame. As another example, the first UWB device may split the payload and SYNC into a first payload portion and a first SYNC portion for including in the first frame, and a second payload portion and a second SYNC portion for including in the second frame.

While described as generating a first and second frame, it is noted that the first UWB device may determine to split a sequence into any number of portions for including in (or distributing across/over) any number of frames. For example, the first UWB device may determine to split a given sequence into four portions for including in four frames, eight portions for including in eight frames, and so forth. The first UWB device may determine to split a sequence into any number of portions based on metric(s) of the connection, based on a size of a payload, etc.

At step 3404, the first UWB device may transmit a first frame including the first portion of the segment. In some embodiments, the first UWB device may transmit the first frame including the first portion of the segment to the second UWB device. Where the segment split across the first frame and at least the second frame is the STS, the first UWB device may transmit the first frame including the first portion of the STS to the second UWB device. Where the segment split across the first frame and at least the second frame is the header/payload/SYNC, the first UWB device may transmit the first frame including the first portion of the header/payload/SYNC to the second device. As such, the first frame may include any combination of portions of segments, which the first UWB device may split across the first and at least the second frame. The first device may transmit the first frame in a first time window to the second UWB device. The first time window may be a slot of a slot schedule for the connection. The first time window may be a sub-slot/mini-slot within a slot of the slot schedule. The first UWB device may transmit the first frame responsive to the first UWB device generating the first frame. In some embodiments, the first UWB device may transmit the first frame responsive to generating both the first and second frame (e.g., once each of the frames including the respective portions of the segment have been generated). The first UWB device may transmit the first frame responsive to generating the first frame, at the first available time window in which the first device is scheduled to transmit the frame to the second UWB device.

At step 3406, the first UWB device may transmit a second frame including the second portion of the segment. Step 3406 may be similar to step 3404 described above. The first UWB device may transmit the second frame including the second portion of the segment to the second UWB device. The first UWB device may transmit the second frame in a second time window. The second time window may be a second slot of the slot schedule (e.g., different from the first slot in which the first frame is transmitted to the second UWB device). The second time window may be a second sub-slot separate from the first sub-slot in which the first frame is transmitted to the second UWB device. In this example, the first and second sub-slots may be sent within the same slot of the slot schedule, though in different defined sub-slots.

In some embodiments, the first UWB device may receive an acknowledgement message from the second UWB device. The first UWB device may receive the (single) acknowledgement message in response to the first frame and the second frame. The acknowledgement message may include an acknowledgement of at least one frame and payload data (e.g., data transmitted from the second UWB device to the first UWB device separate from the acknowledgement). In some embodiments, the first UWB device may receive a first acknowledgement message responsive to transmitting the first frame, and a second acknowledgement message responsive to transmitting the second frame. In other words, the first UWB device may receive the first acknowledgement message between steps 3404 and 3406, and the second acknowledgement message after performance of step 3406. In some embodiments, the first UWB device may receive an acknowledgement message responsive to transmitting both the first and second frames at step 3404 and step 3406. In this example, the acknowledgement message may be responsive to both the first and second frame. Further, the acknowledgement message in this example may include an acknowledgement of the first frame and the second frame, and payload data.

Figure 2:
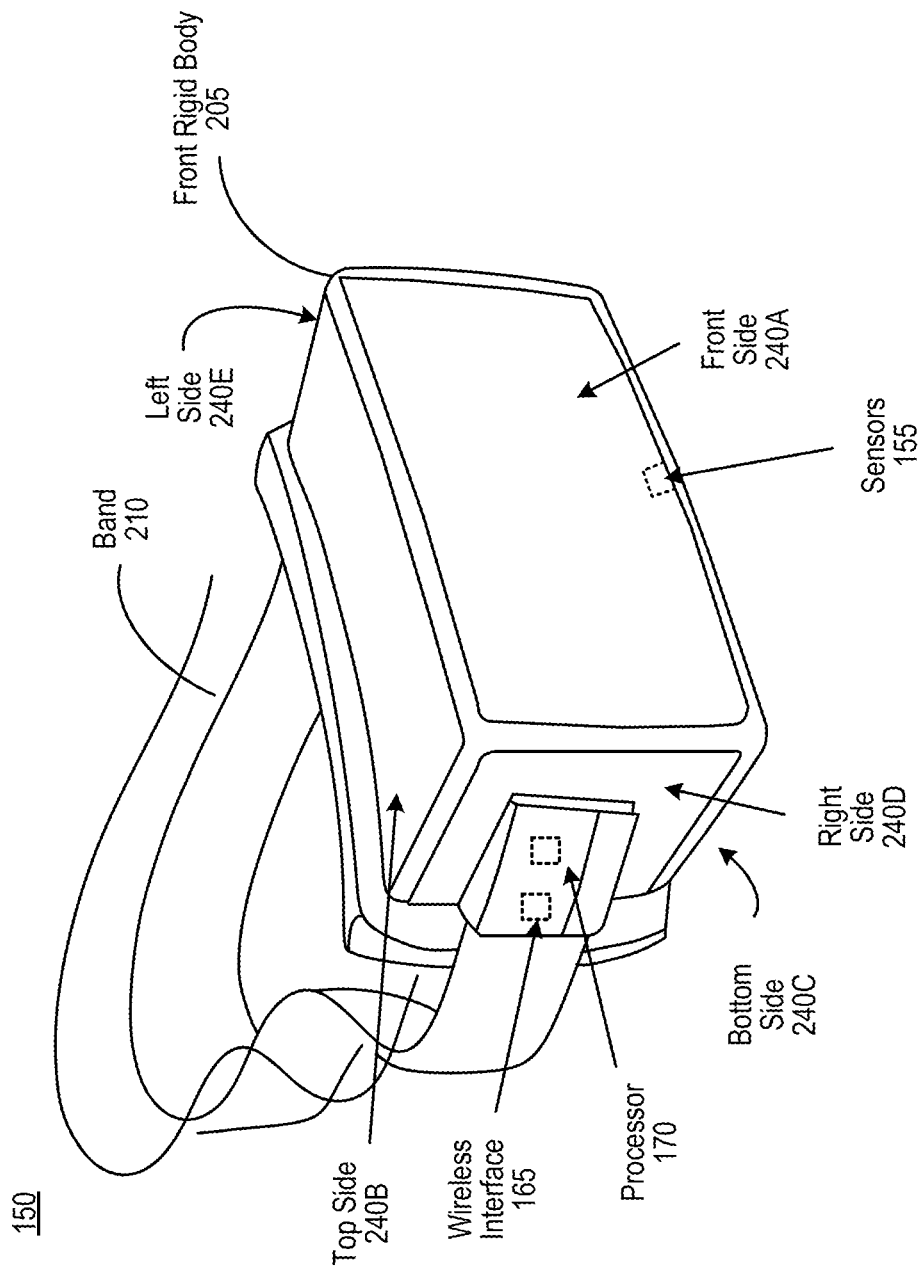
FIG. 2 is a diagram of a head wearable display, according to an example implementation of the present disclosure.
Figure 35:
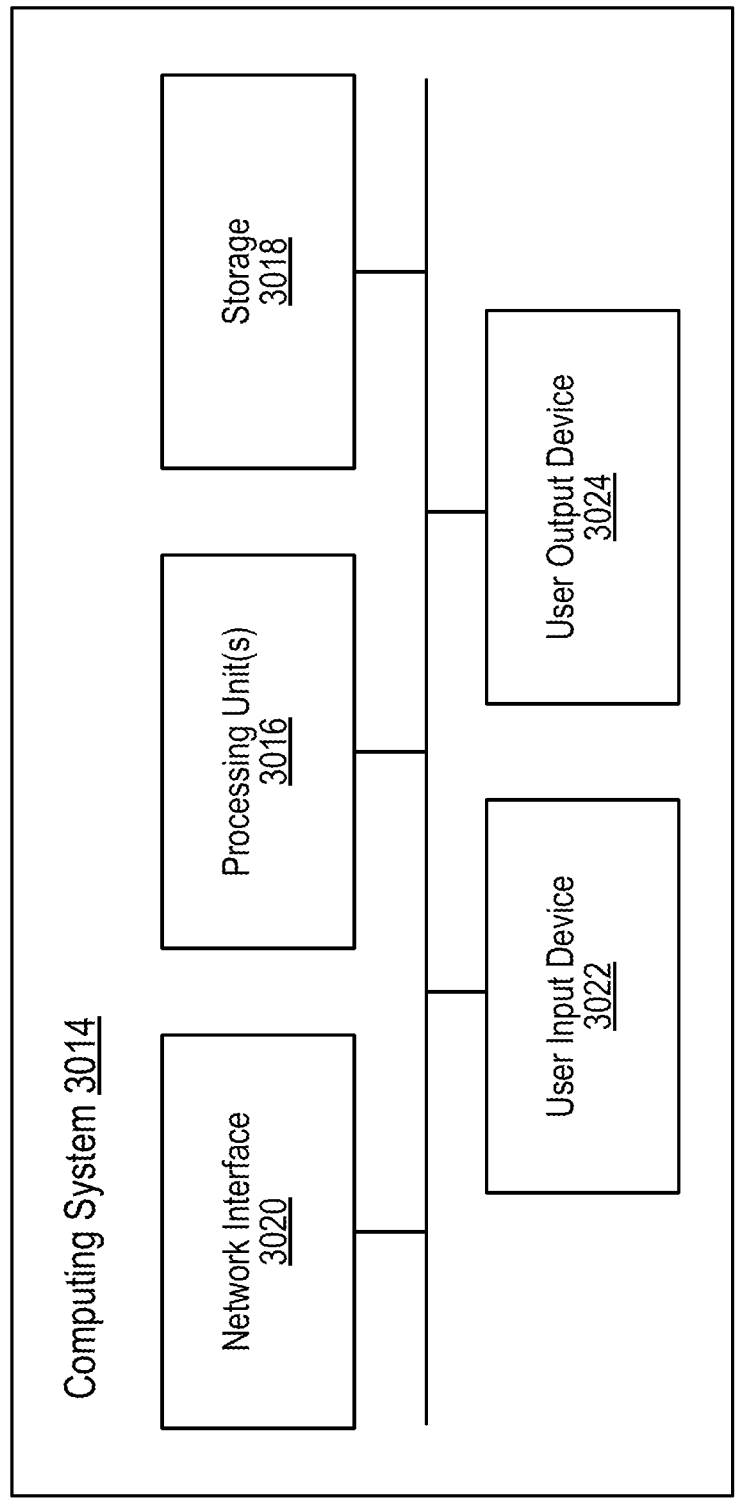
FIG. 35 shows a block diagram of a representative computing system, according to an example implementation of the present disclosure.

Various operations described herein can be implemented on computer systems. FIG. 35 shows a block diagram of a representative computing system 3514 usable to implement the present disclosure. In some embodiments, the computing device 110, the HWD 150, devices 302, 304, or each of the components of FIG. 1-3 are implemented by or may otherwise include one or more components of the computing system 3514. Computing system 3514 can be implemented, for example, as a consumer device such as a smartphone, other mobile phone, tablet computer, wearable computing device (e.g., smart watch, eyeglasses, head wearable display), desktop computer, laptop computer, or implemented with distributed computing devices. The computing system 3514 can be implemented to provide VR, AR, MR experience. In some embodiments, the computing system 3514 can include conventional computer components such as processors 3516, storage device 3518, network interface 3520, user input device 3522, and user output device 3524.

Network interface 3520 can provide a connection to a wide area network (e.g., the Internet) to which WAN interface of a remote server system is also connected. Network interface 3520 can include a wired interface (e.g., Ethernet) and/or a wireless interface implementing various RF data communication standards such as Wi-Fi, Bluetooth, UWB, or cellular data network standards (e.g., 3G, 4G, 5G, 60 GHz, LTE, etc.).

User input device 3522 can include any device (or devices) via which a user can provide signals to computing system 3514; computing system 3514 can interpret the signals as indicative of particular user requests or information. User input device 3522 can include any or all of a keyboard, touch pad, touch screen, mouse or other pointing device, scroll wheel, click wheel, dial, button, switch, keypad, microphone, sensors (e.g., a motion sensor, an eye tracking sensor, etc.), and so on.

User output device 3524 can include any device via which computing system 3514 can provide information to a user. For example, user output device 3524 can include a display to display images generated by or delivered to computing system 3514. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). A device such as a touchscreen that function as both input and output device can be used. Output devices 3524 can be provided in addition to or instead of a display. Examples include indicator lights, speakers, tactile "display" devices, printers, and so on.

Some implementations include electronic components, such as microprocessors, storage and memory that store computer program instructions in a computer readable storage medium (e.g., non-transitory computer readable medium). Many of the features described in this specification can be implemented as processes that are specified as a set of program instructions encoded on a computer readable storage medium. When these program instructions are executed by one or more processors, they cause the processors to perform various operation indicated in the program instructions. Examples of program instructions or computer code include machine code, such as is produced by a compiler, and files including higher-level code that are executed by a computer, an electronic component, or a microprocessor using an interpreter. Through suitable programming, processor 3516 can provide various functionality for computing system 3514, including any of the functionality described herein as being performed by a server or client, or other functionality associated with message management services.

It will be appreciated that computing system 3514 is illustrative and that variations and modifications are possible. Computer systems used in connection with the present disclosure can have other capabilities not specifically described here. Further, while computing system 3514 is described with reference to particular blocks, it is to be understood that these blocks are defined for convenience of description and are not intended to imply a particular physical arrangement of component parts. For instance, different blocks can be located in the same facility, in the same server rack, or on the same motherboard. Further, the blocks need not correspond to physically distinct components. Blocks can be configured to perform various operations, e.g., by programming a processor or providing appropriate control circuitry, and various blocks might or might not be reconfigurable depending on how the initial configuration is obtained.

Implementations of the present disclosure can be realized in a variety of apparatus including electronic devices implemented using any combination of circuitry and software.

Having now described some illustrative implementations, it is apparent that the foregoing is illustrative and not limiting, having been presented by way of example. In particular, although many of the examples presented herein involve specific combinations of method acts or system elements, those acts and those elements can be combined in other ways to accomplish the same objectives. Acts, elements and features discussed in connection with one implementation are not intended to be excluded from a similar role in other implementations or implementations.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit and/or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular can also embrace implementations including a plurality of these elements, and any references in plural to any implementation or element or act herein can also embrace implementations including only a single element. References in the singular or plural form are not intended to limit the presently disclosed systems or methods, their components, acts, or elements to single or plural configurations. References to any act or element being based on any information, act or element can include implementations where the act or element is based at least in part on any information, act, or element.

Any implementation disclosed herein can be combined with any other implementation or embodiment, and references to "an implementation," "some implementations," "one implementation" or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation can be combined with any other implementation, inclusively or exclusively, in any manner consistent with the aspects and implementations disclosed herein.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Systems and methods described herein may be embodied in other specific forms without departing from the characteristics thereof. References to "approximately," "about" "substantially" or other terms of degree include variations of +/−10% from the given measurement, unit, or range unless explicitly indicated otherwise. Coupled elements can be electrically, mechanically, or physically coupled with one another directly or with intervening elements. Scope of the systems and methods described herein is thus indicated by the appended claims, rather than the foregoing description, and changes that come within the meaning and range of equivalency of the claims are embraced therein.

The term "coupled" and variations thereof includes the joining of two members directly or indirectly to one another. Such joining may be stationary (e.g., permanent or fixed) or moveable (e.g., removable or releasable). Such joining may be achieved with the two members coupled directly with or to each other, with the two members coupled with each other using a separate intervening member and any additional intermediate members coupled with one another, or with the two members coupled with each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References to "or" can be construed as inclusive so that any terms described using "or" can indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

References herein to the positions of elements (e.g., "top," "bottom," "above," "below") are merely used to describe the orientation of various elements in the FIGURES. The orientation of various elements may differ according to other exemplary embodiments, and that such variations are intended to be encompassed by the present disclosure.

What is claimed is:

1. A method comprising:
    determining, by a first ultra-wideband (UWB) device, to split a scrambled timestamp sequence (STS) into at least a first portion and a second portion of the STS, for transmission to a second UWB device, according to a size of a payload for transmission to the second UWB device or a metric corresponding to a quality of a connection between the first UWB device and the second UWB device;
    transmitting, by the first UWB device, a first frame comprising the first portion of the STS to the second UWB device; and
    transmitting, by the first UWB device, a second frame comprising the second portion of the STS to the second UWB device.

2. The method of claim 1, wherein determining to split the STS into at least the first portion and the second portion is according to the size of the payload, and the method further comprising:
    determining, by the first UWB device, that a duration to transmit the payload is greater than a slot duration;
    determining, by the first UWB device, a number of frames to generate according to the duration to transmit the payload, and the slot duration; and
    splitting, by the first UWB device, the STS into at least the first portion and the second portion according to the number of frames.

3. The method of claim 1, wherein:
the first frame comprises a first portion of a payload for transmission to the second UWB device, and
the second frame comprises a second portion of the payload for transmission to the second UWB device, the first portion being greater in size than the second portion of the payload.

4. The method of claim 1, wherein:
transmitting the first frame to the second UWB device comprises transmitting, by the first UWB device, the first frame in a first time window to the second UWB device, and
transmitting the second frame to the second UWB device comprises transmitting, by the first UWB device, the second frame in a second time window to the second UWB device.

5. The method of claim 4, wherein the first time window and the second time window respectively comprise a) a first sub-slot and a second sub-slot within one slot of a slot schedule, or b) a first slot and a second slot of the slot schedule.

6. The method of claim 1, wherein the first frame further includes a first portion of a header for transmission to the second UWB device, and the second frame includes a second portion of the header.

7. The method of claim 1, wherein the first frame further includes a first portion of a synchronization signal for transmission to the second UWB device, and the second frame includes a second portion of the synchronization signal.

8. The method of claim 1, further comprising generating, by the first UWB device, at least four frames including the first frame and the second frame, for transmission by the first UWB device to the second UWB device, the at least four frames including respective portions of the STS.

9. The method of claim 1, further comprising:
receiving, by the first UWB device, an acknowledgement message from the second UWB device, in response to the first frame and the second frame, wherein the acknowledgement message comprises a) an acknowledgement of the first frame and the second frame, and b) payload data.

10. A first device comprising:
a UWB antenna; and
one or more processors configured to:
determine to split a scrambled timestamp sequence (STS) into at least a first portion and a second portion of the STS, for transmission to a second device, according to a size of a payload for transmission to the second device or a metric corresponding to a quality of a connection between the first device and the second device;
transmit, via the UWB antenna, a first frame comprising the first portion of the STS to the second device; and
transmit, via the UWB antenna, a second frame comprising the second portion of the STS to the second device.

11. The first device of claim 10, wherein the one or more processors are configured to determine to split the STS into at least the first portion and the second portion according to the size of the payload, and wherein the one or more processors are configured to:
determine that a duration to transmit the payload is greater than a slot duration;
determine a number of frames to generate, according to the duration to transmit the payload, and the slot duration; and
split the STS into at least the first portion and the second portion, according to the number of frames.

12. The first device of claim 10, wherein:
the first frame comprises a first portion of a payload for transmission to the second device, and
the second frame comprises a second portion of the payload for transmission to the second device, the first portion being greater in size than the second portion of the payload.

13. The first device of claim 10, wherein the UWB antenna is configured to transmit the first frame in a first time window to the second device, and transmit the second frame in a second time window to the second device.

14. The first device of claim 13, wherein the first time window and the second time window respectively comprise a) a first sub-slot and a second sub-slot within one slot of a slot schedule, or b) a first slot and a second slot of the slot schedule.

15. The first device of claim 10, wherein the first frame includes a first portion of a header for transmission to the second device, and the second frame includes a second portion of the header.

16. The first device of claim 10, wherein the first frame further includes a first portion of a synchronization signal for transmission to the second device, and the second frame includes a second portion of the synchronization signal.

17. The first device of claim 10, wherein the one or more processors are configured to generate at least four frames including the first frame and the second frame, for transmission by the first device to the second device, the at least four frames including respective portions of the STS.

18. A non-transitory computer readable medium storing instructions that, when executed by one or more processors of a first device, cause the one or more processors to:
determine to split a scrambled timestamp sequence (STS) into at least a first portion and a second portion of the STS, for transmission to a second device, according to a size of a payload for transmission to the second device or a metric corresponding to a quality of a connection between the first device and the second device;
transmit, via a UWB antenna, a first frame comprising the first portion of the STS to the second device; and
transmit, via the UWB antenna, a second frame comprising the second portion of the STS to the second device.

19. The method of claim 1, wherein the metric comprises at least one of a throughput, an uplink speed, a downlink speed, a round trip time, or a number of packets or frames dropped.

20. The first device of claim 10, wherein the metric comprises at least one of a throughput, an uplink speed, a downlink speed, a round trip time, or a number of packets or frames dropped.

* * * * *